(12) United States Patent
Gaknoki et al.

(10) Patent No.: US 8,803,449 B2
(45) Date of Patent: *Aug. 12, 2014

(54) INTEGRATED ON-TIME EXTENSION FOR NON-DISSIPATIVE BLEEDING IN A POWER SUPPLY

(71) Applicant: Power Integrations, Inc., San Jose, CA (US)

(72) Inventors: Yury Gaknoki, San Jose, CA (US); Mingming Mao, Saratoga, CA (US); Tiziano Pastore, Los Gatos, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/960,086

(22) Filed: Aug. 6, 2013

(65) Prior Publication Data

US 2013/0320882 A1 Dec. 5, 2013

Related U.S. Application Data

(63) Continuation of application No. 13/627,902, filed on Sep. 26, 2012, now Pat. No. 8,531,133, which is a continuation of application No. 12/703,072, filed on Feb. 9, 2010, now Pat. No. 8,299,730.

(51) Int. Cl.
*H05B 37/02* (2006.01)

(52) U.S. Cl.
USPC .............................. 315/307; 315/297; 315/360

(58) Field of Classification Search
USPC ................. 315/291, 294, 297, 307, 308, 360; 323/282, 284; 363/16, 20, 21.01, 363/21.12, 21.17, 21.18, 56.11, 95, 97, 131
See application file for complete search history.

(56) References Cited

U.S. PATENT DOCUMENTS

| 5,583,402 A | 12/1996 | Moisin et al. |
| 5,729,443 A | 3/1998 | Pavlin |

(Continued)

FOREIGN PATENT DOCUMENTS

| CN | 1588247 A | 3/2005 |
| CN | 1592067 A | 3/2005 |

(Continued)

OTHER PUBLICATIONS

EP 13168676.8—European Office Action, dated Sep. 9, 2013 (6 pages).

(Continued)

*Primary Examiner* — Tung X Le
(74) *Attorney, Agent, or Firm* — Blakely Sokoloff Taylor & Zafman LLP

(57) ABSTRACT

An example controller for a switched mode power supply includes a zero crossing detector, drive logic, and a logic gate. The zero-crossing detector generates a zero-crossing signal indicating a zero-crossing condition in the power supply. The drive logic generates a drive logic output signal in response to the zero-crossing signal and in response to a feedback signal, where the drive logic output signal is representative of an on-time of a switch to regulate an output of the power supply. The logic gate is coupled to receive a first signal representative of a current through the switch and a second signal representative of a zero-crossing time threshold. The logic gate is further coupled to extend the on-time of the switch until current through the switch reaches a zero-crossing current threshold or until the on-time of the switch reaches the zero-crossing time threshold.

14 Claims, 12 Drawing Sheets

(56) References Cited

U.S. PATENT DOCUMENTS

| | | | |
|---|---|---|---|
| 5,818,707 | A | 10/1998 | Seong et al. |
| 6,452,344 | B1 | 9/2002 | MacAdam et al. |
| 6,900,995 | B2 | 5/2005 | Muegge et al. |
| 7,035,122 | B2 | 4/2006 | Kim et al. |
| 7,382,100 | B2 | 6/2008 | Johnson et al. |
| 7,830,682 | B2 | 11/2010 | Zhang et al. |
| 7,898,823 | B2 | 3/2011 | Wu |
| 7,936,157 | B2 * | 5/2011 | Kashima ............... 323/282 |
| 8,149,600 | B2 | 4/2012 | Teo |
| 8,299,730 | B2 | 10/2012 | Gaknoki et al. |
| 2005/0078493 | A1 | 4/2005 | Kim et al. |
| 2007/0024213 | A1 | 2/2007 | Shteynberg et al. |
| 2008/0002439 | A1 * | 1/2008 | Allinder ............... 363/21.01 |
| 2008/0018268 | A1 | 1/2008 | Green |
| 2010/0141173 | A1 | 6/2010 | Negrete |
| 2011/0194312 | A1 | 8/2011 | Gaknoki et al. |
| 2013/0021828 | A1 | 1/2013 | Gaknoki et al. |

FOREIGN PATENT DOCUMENTS

| | | |
|---|---|---|
| CN | 101027564 A | 8/2007 |
| CN | 101447735 A | 6/2009 |
| EP | 2 104 401 A1 | 9/2009 |
| JP | 2009-238520 A | 10/2009 |
| JP | 2009-261143 A | 11/2009 |
| WO | WO 2009/095836 A2 | 8/2009 |

OTHER PUBLICATIONS

EP 13168676—European Search Report, dated Aug. 27, 2013 (4 pages).

"Replacement for Standard Lightbulb—TPS92001 PM4981," LED Reference Design Cookbook, Texas Instruments, 4Q, 2009, pp. 18-19.

Ernst, L. M., et al., "Current Zero Crossing Detection for Thyristor Control," ip.com Journal, ip.com Inc., West Henrietta, NY, US, Aug. 1, 1972, ISSN: 1533-0001 (3 pages).

EP 11153312—European Search Report, dated May 18, 2011 (2 pages).

EP 11153312—European Office Action, dated Jun. 9, 2011 (6 pages).

U.S. Appl. No. 12/703,095—Non-Final Office Action, mailed Jan. 11, 2012, 6 pages.

U.S. Appl. No. 12/703,095—Non-Final Office Action, mailed May 14, 2012, 7 pages.

CN 201110035289.7—Chinese First Office Action with Search Report and English Translation, issued Mar. 18, 2013 (16 pages).

CN 201110035279.3—Chinese First Office Action with Search Report and English Translation, issued Mar. 20, 2013 (15 pages).

* cited by examiner

INTEGRATED ON-TIME EXTENSION FOR NON-DISSIPATIVE BLEEDING IN A POWER SUPPLY

REFERENCE TO RELATED APPLICATION

The present application is a continuation of U.S. patent application Ser. No. 13/627,902, filed Sep. 26, 2012, which is a continuation of U.S. patent application Ser. No. 12/703,072, filed Feb. 9, 2010, now issued as U.S. Pat. No. 8,299,730. Application Ser. No. 13/627,902 and U.S. Pat. No. 8,299,730 are incorporated herein by reference.

BACKGROUND OF THE INVENTION

1. Field of the Invention

The present invention relates generally to power supplies, and more specifically to controllers for switched mode power supplies.

2. Discussion of the Related Art

Electronic devices use power to operate. Switched mode power supplies are commonly used due to their high efficiency, small size and low weight to power many of today's electronics. Conventional wall sockets provide a high voltage alternating current. In a switching power supply a high voltage alternating current (ac) input is converted to provide a well regulated direct current (dc) output through an energy transfer element. The switched mode power supply control circuit usually provides output regulation by sensing the output and controlling it in a closed loop. In operation, a switch is utilized to provide the desired output by varying the duty cycle (typically the ratio of the on time of the switch to the total switching period) of the switch in a switched mode power supply.

Requirements such as efficiency, size, weight and cost are usually taken into account when designing a switched mode power supply. Typically, the controller which controls the switching of the switched mode power supply is designed as an integrated circuit with various terminals which may function as input terminals, output terminals or both. When the switch of a switched mode power supply is integrated with the controller, two terminals of the integrated circuit correspond to the two ends of the switch. Various terminals of the integrated circuit may be utilized as the feedback terminal, a function program terminal, or an input voltage sense terminal for the controller. For some applications of the switched mode power supply, the ac input voltage is sensed to determine the zero-crossing of the ac input voltage. In general, the ac input voltage is herein also referred to as the line input voltage. The zero-crossing generally refers to when the ac input voltage crosses zero voltage. In other words, the zero-crossing refers to when the magnitude of the ac input voltage changes sign from positive to negative or from negative to positive. The zero-crossing of the line input voltage may be used for various applications. The zero-crossing of the line input voltage maybe used to determine the ac line frequency or it may be used to update the internal clock of a controller of a power supply.

In one type of dimming for lighting applications, a triac dimmer circuit typically removes a portion of the ac input voltage to limit the amount of voltage and current supplied to an incandescent lamp. This is known as phase dimming because it is often convenient to designate the position of the missing voltage in terms of a fraction of the period of the ac input voltage measured in degrees. In general, the ac input voltage is a sinusoidal waveform and the period of the ac input voltage is referred to as a full line cycle. As such, half the period of the ac input voltage is referred to as a half line cycle. An entire period of the ac input voltage has 360 degrees, and a half line cycle has 180 degrees. Typically, the phase angle is a measure of how many degrees (from a reference of zero degrees) of each half line cycle the dimmer circuit removes. Although phase angle dimming works well with incandescent lamps that receive the altered ac line voltage directly, it typically creates problems for light emitting diode (LED) lamps. LED lamps require a regulated power supply to provide regulated current and voltage from the ac power line. Conventional regulated power supplies are typically designed to ignore distortions of the ac input voltage. Their purpose is to deliver a constant regulated output until a low input voltage causes them to shut off completely. As such, conventional regulated power supplies would not dim the LED lamp. Unless a power supply for an LED lamp is specially designed to recognize and respond to the voltage from a triac dimmer circuit in a desirable way, a triac dimmer is likely to produce unacceptable results such as flickering of the LED lamp, flashing of the LED lamp at high phase angles, and color shifting of the LED lamp. Thus, a power supply may include an improved conventional power supply controller that is designed to respond to a triac dimmer circuit by directly sensing the ac input voltage to determine when the ac input voltage is cut-off due to the dimming circuit. Typically, the ac input voltage is directly sensed with circuitry external to the integrated circuit of the conventional controller. The sensed ac input voltage may be received by the integrated circuit of the improved conventional controller at a terminal dedicated to receiving the sensed ac input voltage or at another terminal which performs multiple functions.

Another difficulty in using triac dimming circuits with LED lamps comes from a characteristic of the triac itself. A triac is a semiconductor component that behaves as a controlled ac switch. In other words, it behaves as an open switch to an ac voltage until it receives a trigger signal at a control terminal which causes the switch to close. The switch remains closed as long as the current through the switch is above a value referred to as the holding current. Most incandescent lamps take more than enough current from the ac power source to allow reliable and consistent operation of a triac. However, the low current taken by efficient power supplies which drive LED lamps from the ac power source may not be enough to keep a triac conducting for the expected portion of the ac line period. Therefore, conventional power supply controller designs usually rely on the power supply including a dummy load, sometimes called a bleeder circuit, to take enough extra current from the input of the power supply to keep the triac conducting after it is triggered. In general, a conventional bleeder circuit is external from the integrated circuit of the conventional power supply controller. However, use of the conventional bleeder circuit external to the conventional power supply controller requires the use of extra components with associated penalties in cost and efficiency.

Another important consideration for power supply design is the shape and phase of the input current drawn from the ac power source relative to the ac input voltage waveform. The voltage waveform of the ac power source is nominally a sinusoid. However, due to the non-linear loading that many switching power supplies present to the ac power source, the wave shape of the current drawn from the ac power source by the power supply is non-sinusoidal and/or out of phase with the ac input voltage. This leads to increased losses in the ac mains distribution system and, in many parts of the world, is now the subject of legislative or voluntary requirements that force power supply manufacturers to ensure the input current drawn by the power supply is sinusoidal and in phase with the ac input voltage waveform.

The correction of the input current waveform in this way is referred to as power factor correction (PFC) and often requires an input stage to the power supply specifically designed to perform the function of power factor correction. If the input ac current and voltage waveforms are sinusoidal and perfectly in phase, the power factor of the power supply is 1. In other words, a power factor corrected input will present a load to the ac source that is equivalent to coupling a variable resistance across the ac source. As harmonic distortion and/or phase displacement of the input current relative to the ac source voltage increase, the power factor decreases below 1. Power factor requirements typically require power factors greater than 0.9 and may have requirements for the harmonic content of the input current waveform.

Common methods to increase the power factor of a power supply include the use of a boost converter or flyback converter to establish an input current waveform close to the ideal sinusoidal shape while being in phase with the ac source voltage. Another method to increase the power factor of a power supply is to utilize a bleeder circuit. Switched mode power supplies typically include a filter capacitor which filters the high frequency current through the switch of a switched mode power supply. The bleeder circuit may facilitate the discharging of the filter capacitor which helps to pull down the voltage on the filter capacitor such that the voltage across the filter capacitor substantially follows positive magnitude of the ac input voltage. As such, the bleeder circuit helps to establish an input current waveform close to the ideal sinusoidal shape while being in phase with the ac source voltage. However, for many applications a conventional bleeder circuit is typically a circuit external to the integrated circuit of the power supply controller. Typically, the conventional bleeder circuit is implemented with a resistor which is coupled at the input of the power supply. However, as stated above, the use of a conventional bleeder circuit external to the conventional power supply controller requires the use of extra components with associated penalties in cost and efficiency.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
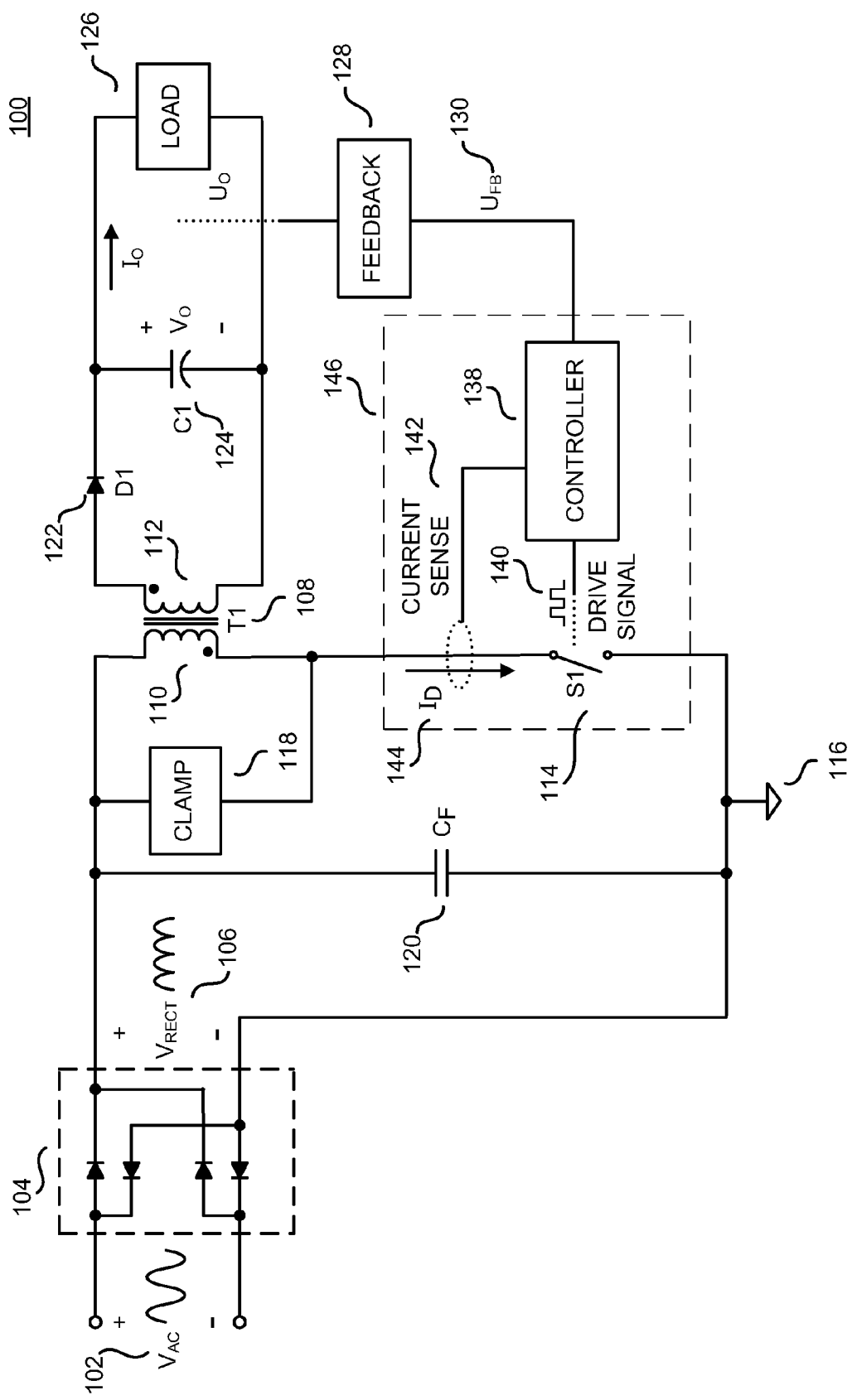
FIG. 1 is a functional block diagram illustrating an example switching power supply utilizing a controller in accordance with an embodiment of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of a method and apparatus for a non-dissipative integrated bleeder for triac dimming of LED drivers for illumination are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. In addition, it is appreciated that the figures provided herewith are for explanation purposes to persons ordinarily skilled in the art and that the drawings are not necessarily drawn to scale.

For some applications of switched mode power supplies, a dc input voltage is sensed to determine the zero-crossing of the ac input voltage. For phase dimming applications of light emitting diodes (LEDs), the duration of the zero-crossing of the line input voltage would be sensed by a power supply controller. Determining the duration of the zero-crossing of the ac input voltage would indicate to the power supply controller that a dimmer circuit is being utilized and hence alter the quantity to which the output of the power supply is regulated. For embodiments of the present invention, the power supply controller utilizes on-time extension to extend the on-time of the switch which facilitates the determination of the zero-crossing of the line input voltage.

In addition, for phase dimming applications of LEDs which utilize a triac dimming circuit, a bleeder circuit may be utilized to take extra current from the input of the power supply to help keep the triac of the triac dimmer circuit conducting. A triac is a semiconductor component that behaves as a controlled ac switch. In other words, it behaves as an open switch to an ac voltage until it receives a trigger signal at a control terminal which causes the switch to close. The switch remains closed as long as the current through the switch is above a value referred to as the holding current. Most incandescent lamps take more than enough current from the ac power source to allow reliable and consistent operation of a triac. However, the low current taken by efficient power supplies which drive LEDs from the ac power source may not be enough to keep a triac conducting for the expected portion of the ac line period. The bleeder circuit may be utilized to take extra current from the input of the power supply to help keep the triac of the triac dimmer circuit conducting. In general, the bleeder circuit is external from the power supply controller. However, for embodiments of the present invention, the on-time extension utilized by the power supply controller to extend the on-time of the switch may also function as a bleeder circuit. The on-time extension allows the switch in the power supply to remain on for longer than its intended on-time. As such, more charge is removed from the filter capacitor and extra current is taken from the input of the power supply.

The bleeder circuit may also be utilized for power factor correction (PFC) purposes. One method to increase the power factor of a power supply is to utilize a bleeder circuit. Switched mode power supplies typically include a filter capacitor which filters the high frequency current through the switch of a switched mode power supply. The bleeder circuit may facilitate the discharging of the filter capacitor which helps to pull down the voltage on the filter capacitor such that the voltage across the filter capacitor substantially follows positive magnitude of the ac input voltage. As such, the bleeder circuit helps to establish an input current waveform close to the ideal sinusoidal shape while being in phase with the ac source voltage. However, for many applications the bleeder circuit is typically a circuit external to the integrated circuit of the power supply controller. Typically, the bleeder circuit is implemented with a resistor which is coupled at the input of the power supply. This solution may be undesirable because the bleeder circuit would dissipate energy (in the form of heat) and requires the use of extra components with associated penalties in cost and efficiency. However, for embodiments of the present invention, the on-time extension utilized by the power supply controller to extend the on-time of the switch may also function as a bleeder circuit. By extending the on-time of the switch past the intended on-time, more charge is removed from the filter capacitor and the voltage across the filter capacitor substantially follows positive magnitude of the ac input voltage.

In addition, the ac input voltage is typically directly sensed with circuitry external to the integrated circuit of the conventional controller. The sensed ac input voltage may be received by the conventional controller at a terminal dedicated to receiving the sensed ac input voltage or at another terminal which performs multiple functions. Additional terminals, however, add unwanted cost and size to the conventional controller of the switched mode power supply. Circuitry external to the integrated circuit of the conventional controller also adds cost to the switched mode power supply. With the embodiments of the present invention, the input voltage may be indirectly sensed by using the current through the switch of the switched mode power supply. As a result, using the terminal already used for one end of the switch also to indirectly sense the ac input voltage would remove the need for a terminal dedicated just to sensing the ac input voltage and would also eliminate the need for external circuitry for sensing the ac input voltage.

Referring first to FIG. 1, a functional block diagram of an example switching power supply 100 is illustrated including ac input voltage $V_{AC}$ 102, a bridge rectifier 104, rectified voltage $V_{RECT}$ 106, an energy transfer element T1 108, a primary winding 110 of the energy transfer element T1 108, a secondary winding 112 of the energy transfer element T1 108, a switch S1 114, an input return 116, a clamp circuit 118, a filter capacitor $C_F$ 120, a rectifier D1 122, an output capacitor C1 124, an output quantity $U_O$, an output voltage $V_O$, an output current $I_O$, a feedback circuit 128, a feedback signal $U_{FB}$ 130, a controller 138, a drive signal 140, a current sense input signal 142, and switch current $I_D$ 144. Also illustrated in FIG. 1 is a load 126 coupled to the switching power supply 100. The example switching power supply 100 illustrated in FIG. 1 is configured generally as a flyback regulator, which is one example of a switching power supply topology which may benefit from the teachings of the present invention. However, it is appreciated that other known topologies and configurations of switching power supply regulators may also benefit from the teachings of the present invention.

The switching power supply 100 provides output power to the load 126 from an unregulated input voltage. In one example, the input voltage is the ac input voltage $V_{AC}$ 102. In another example, the input voltage is a rectified ac input voltage such as rectified voltage $V_{RECT}$ 106. As shown, bridge rectifier 104 receives the ac input voltage $V_{AC}$ 102 and produces the rectified voltage $V_{RECT}$ 106. The bridge rectifier 104 further couples to the energy transfer element T1 108. In some embodiments of the present invention, the energy transfer element T1 108 may be a coupled inductor. In other embodiments, the energy transfer element T1 108 may be a transformer. In the example of FIG. 1, the energy transfer element T1 108 includes two windings, a primary winding 110 and a secondary winding 112. However, it should be appreciated that the energy transfer element T1 108 may have more than two windings. The primary winding 110 is further coupled to switch S1 114, which is then further coupled to input return 116. In one embodiment, the switch S1 114 may be a transistor such as a metal-oxide-semiconductor field-effect transistor (MOSFET). In another example, controller 138 may be implemented as a monolithic integrated circuit or may be implemented with discrete electrical components or a combination of discrete and integrated components. Controller 138 and switch S1 114 could form part of an integrated circuit 146 that is manufactured as either a hybrid or monolithic integrated circuit.

In addition, the clamp circuit 118 is illustrated in the embodiment of FIG. 1 as being coupled across the primary winding 110 of the energy transfer element T1 108. The filter capacitor $C_F$ 120 may couple across the primary winding 110 and switch S1 114. In other words, the filter capacitor $C_F$ 120 may couple to the bridge rectifier 104 and input return 116. Secondary winding 112 of the energy transfer element T1 108 is coupled to the rectifier D1 122. In the example of FIG. 1, the rectifier D1 122 is exemplified as a diode. However, in some embodiments the rectifier D1 122 may be a transistor used as a synchronous rectifier. Both the output capacitor C1 124 and the load 124 are shown in FIG. 1 as being coupled to the rectifier D1 122. An output is provided to the load 126 and may be provided as either a regulated output voltage $V_O$, regulated output current $I_O$, or a combination of the two.

The switched mode power supply 100 further comprises circuitry to regulate the output which is exemplified as output quantity $U_O$. In general, the regulated output quantity $U_O$ is either an output voltage $V_O$, output current $I_O$, or a combination of the two. A feedback circuit 128 is coupled to sense the output quantity $U_O$ of the switched mode power supply 100 and produces the feedback signal $U_{FB}$ 130. In other embodiments, the feedback signal $U_{FB}$ 130 may be derived from sensing one or more quantities on the input side of the transformer that are representative of the output quantity $U_O$. The feedback circuit 128 is further coupled to a terminal of the controller 138 such that the controller 138 receives the feedback signal $U_{FB}$ 130. The controller 138 further includes a terminal for receiving the current sense input signal 142. The current sense input signal 142 is representative of the switch current $I_D$ 144 in the switch S1 114. In addition, the switch S1 114 receives the drive signal 140 from the controller 138.

In operation, the switching power supply 100 of FIG. 1 provides output power to the load 126 from an unregulated input such as the ac input voltage $V_{AC}$ 102. The ac input voltage $V_{AC}$ 102 is received by the bridge rectifier 104 and produces the rectified voltage $V_{RECT}$ 106. The filter capacitor $C_F$ 120 filters the high frequency current from the switch S1 114. For other applications, the filter capacitor $C_F$ 120 may be large enough such that a dc voltage is applied to the energy transfer element T1 108. However for power supplies with power factor correction (PFC), a small filter capacitor $C_F$ 120 may be utilized to allow the voltage applied to the energy transfer element T1 108 to substantially follow the rectified voltage $V_{RECT}$ 106. As such the value of the filter capacitor $C_F$ 120 may be chosen such that the voltage on the filter capacitor $C_F$ 120 reaches substantially zero during each half-line cycle of the input line voltage. Or in other words, the voltage on the filter capacitor $C_F$ 120 substantially follows the positive magnitude of the ac input voltage $V_{AC}$ 102. As a result, the zero-crossing condition may be detected by the controller 138. In addition, as will be further discussed, the on-time extension utilized by the controller 138 removes more charge from the filter capacitor $C_F$ 120. As a result, the discharging of the filter capacitor $C_F$ 120 helps to pull down the voltage at the primary winding 110 which may help the controller 138 to detect the zero-crossing of the ac input voltage $V_{AC}$ 102.

The switching power supply 100 utilizes the energy transfer element T1 108 to transfer voltage between the primary 110 and the secondary 112 windings. The clamp circuit 118 is coupled to the primary winding 110 to limit the maximum voltage on the switch S1 114. Switch S1 114 is opened and closed in response to the drive signal 140. It is generally understood that a switch that is closed may conduct current and is considered on, while a switch that is open cannot conduct current and is considered off. In some embodiments, the switch S1 114 may be a transistor and the switch S1 114 and the controller 138 may form part of integrated circuit 146. In operation, the switching of the switch S1 114 produces a pulsating current at the rectifier D1 122. The current in the rectifier D1 122 is filtered by the output capacitor C1 124 to produce a substantially constant output voltage $V_O$, output current $I_O$, or a combination of the two at the load 126. In some embodiments, the load 126 is an LED array.

The feedback circuit 128 senses the output quantity $U_O$ of the power supply 100 to provide the feedback signal $U_{FB}$ 130 to the controller 138. The feedback signal $U_{FB}$ 130 may be a voltage signal or a current signal and provides information regarding the output quantity $U_O$ to the controller 138. In addition, the controller 138 receives the current sense input signal 142 which relays the switch current $I_D$ 144 in the switch S1 114. The switch current $I_D$ 144 may be sensed in a variety of ways, such for example the voltage across a discrete resistor or the voltage across a transistor when the transistor is conducting. The controller 138 utilizes the switch current $I_D$ 144 indicated by the current sense input signal 142 to determine zero-crossing of the ac input voltage $V_{AC}$ 102. As will be discussed further, the controller 138 then generates a zero-crossing signal which represents information regarding the zero-crossing of the ac input voltage $V_{AC}$ 102. In addition, as explained further below, the controller 138 utilizes on-time extension of the switch S1 114 to determine when the ac input voltage $V_{AC}$ 102 is in a zero-crossing condition. The zero-crossing signal may be used to calibrate the internal frequency of the controller or to determine when a phase dimming circuit is utilized.

The controller 138 outputs a drive signal 140 to operate the switch S1 114 in response to various system inputs to substantially regulate the output quantity $U_O$ to the desired value. In one embodiment, the drive signal 140 may be a rectangular pulse waveform with varying lengths of logic high and logic low sections, with the logic high value corresponding to a closed switch and a logic low corresponding to an open switch. In another embodiment, the drive signal 140 may be comprised of substantially fixed-length logic high (or ON) pulses and regulated by varying the number of ON pulses per number of oscillator cycles.

Figure 2A:
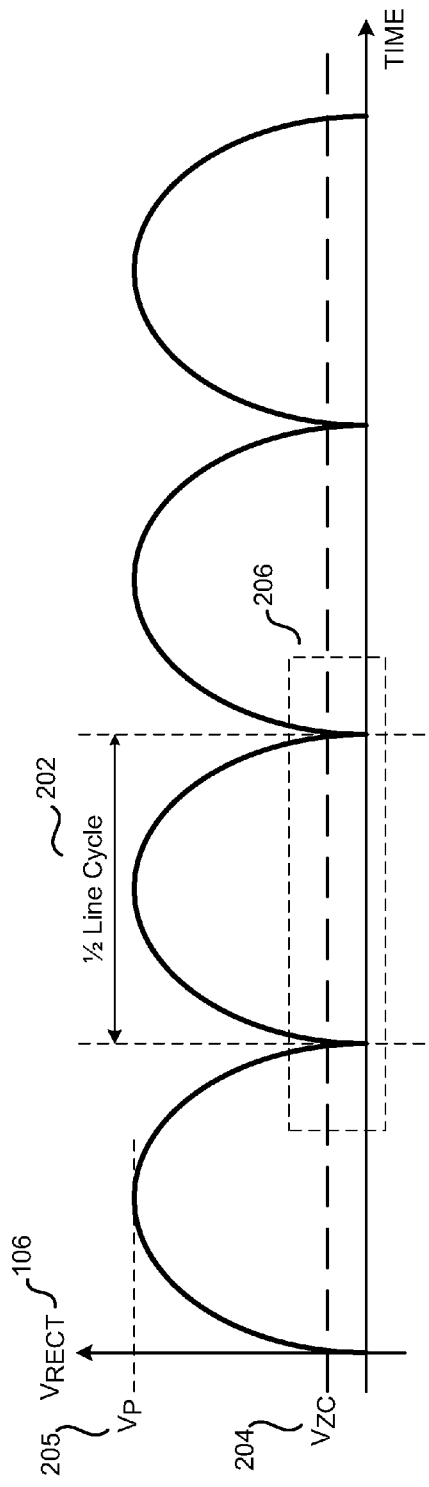
FIG. 2A is a diagram illustrating an example rectified input voltage waveform of the switching power supply of FIG. 1 in accordance with an embodiment of the present invention.
Figure 2B:
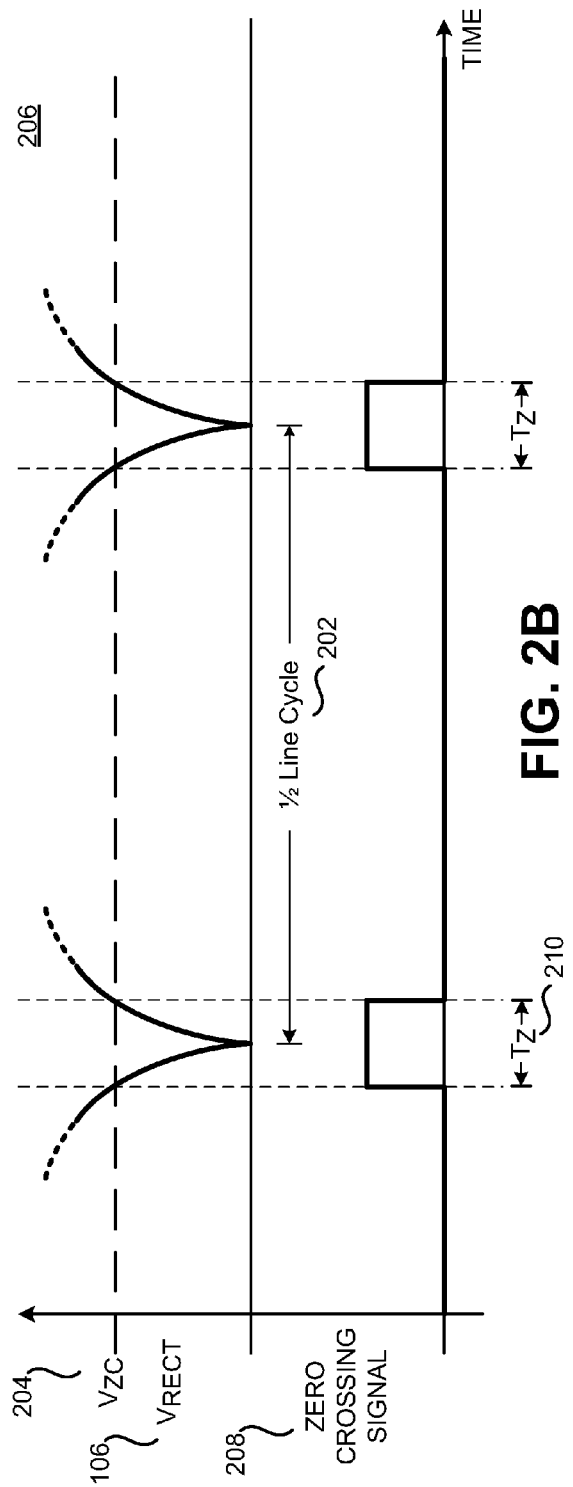
FIG. 2B is a diagram illustrating a portion of the example rectified input voltage of FIG. 2A and corresponding zero-crossing signal in accordance with an embodiment of the present invention.

Referring next to FIG. 2A, a diagram of an example waveform of the rectified voltage $V_{RECT}$ 106 of the switching power supply of FIG. 1 is illustrated including a half line cycle 202, a zero-crossing voltage threshold 204, peak voltage $V_P$ 205, and a portion 206. FIG. 2B illustrates the portion 206 of the example rectified voltage $V_{RECT}$ 106 and the corresponding zero-crossing signal 208.

In general, the ac input voltage $V_{AC}$ 102 is a sinusoidal waveform with the period of the ac input voltage $V_{AC}$ 102 referred to as a full line cycle. Mathematically: $V_{AC}(t)=V_P \sin(2\pi f_L t)$. Where $V_P$ 205 is the peak voltage of the ac input voltage $V_{AC}$ 102 and $f_L$, is the frequency of the line input voltage. Or in other words, $f_L$, is the line frequency of the ac input voltage $V_{AC}$ 102. It should be appreciated that the full line cycle is the reciprocal of the line frequency $f_L$, or mathematically: full line cycle=$1/f_L$. As mentioned above, the rectified voltage $V_{RECT}$ 106 is the resultant output of the bridge rectifier 104 when the input to the bridge rectifier 104 is the ac input voltage $V_{AC}$ 102. For the example rectified voltage $V_{RECT}$ 106 shown in FIG. 2A, the bridge rectifier 104 has converted the ac input voltage $V_{AC}$ 102 such that the output of the bridge rectifier 104 is of a positive magnitude, or mathematically: $V_{RECT}=|V_{AC}|=|V_P \sin(2\pi f_L t)|$. As a result, the rectified voltage $V_{RECT}$ 106 repeats every half line cycle 202. FIG. 2A also illustrates the zero-crossing voltage threshold $V_{ZC}$ 204. For some embodiments, the zero-crossing voltage threshold $V_{ZC}$ 204 is substantially equal to zero. For other embodiments, the zero-crossing voltage $V_{ZC}$ 204 is substantially one fifth of the peak voltage $V_P$ 205 of the rectified voltage $V_{RECT}$ 106. For example, if the peak voltage $V_P$ 205 of the rectified voltage $V_{RECT}$ 106 is substantially equal to 125 V, the zero-crossing voltage threshold $V_{ZC}$ 204 is substantially equal to 25 V. In another embodiment, the zero-crossing voltage threshold $V_{ZC}$ 204 is substantially one fourth of the peak voltage $V_P$ 205 of the rectified voltage $V_{RECT}$ 106. It should be appreciated that as the value of the zero-crossing voltage threshold $V_{ZC}$ 204 is closer to zero voltage, the more accurate the zero-crossing signal 208. However, the closer the value of the rectified voltage $V_{RECT}$ 106 is to zero voltage the more difficult it may be for embodiments of controller 138 to sense the value of the rectified voltage $V_{RECT}$ 106. In particular, the controller 138 may have some difficulty sensing the value of the rectified voltage $V_{RECT}$ 106 through the switch current $I_D$ 144 provided by the current sense input signal 142 when the rectified voltage $V_{RECT}$ 106 is at or near zero voltage. As such embodiments of controller 138 may have a non-zero value for the zero-crossing voltage threshold $V_{ZC}$ 204 to allow the sensing of the zero-crossing condition when the value of the rectified voltage $V_{RECT}$ 106 is at or near zero voltage. In addition, the rectified voltage $V_{RECT}$ 106 may not reach zero due in part to the selected value of the filter capacitor $C_F$ 120.

FIG. 2B illustrates the portion 206 of the example rectified voltage $V_{RECT}$ 106 and the corresponding zero-crossing signal 208. The controller 138 senses the value of the ac input voltage $V_{AC}$ 102 and the rectified voltage $V_{RECT}$ 106 to produce the zero-crossing signal 208. When the rectified voltage $V_{RECT}$ 106 is less than the zero-crossing voltage threshold $V_{ZC}$ 204, the zero-crossing signal 208 changes to a state which indicates a zero-crossing condition exists. The zero-crossing signal 208 does not change from that state until the rectified voltage $V_{RECT}$ 106 is greater than the zero-crossing voltage threshold $V_{ZC}$ 204. For the example shown in FIG. 2B, the zero-crossing signal 208 is a rectangular pulse waveform with logic high and logic low sections. When the rectified voltage $V_{RECT}$ 106 is less than the zero-crossing voltage threshold $V_{ZC}$ 204, the value of the zero-crossing signal 208 is logic high. When the rectified voltage $V_{RECT}$ 106 is greater than the zero-crossing voltage threshold $V_{ZC}$ 204, the value of the zero-crossing signal 208 is logic low. The length of time which the zero-crossing signal 208 indicates the zero-crossing condition exists is denoted as the zero-crossing pulse width $T_Z$ 210. For the example shown in FIG. 2B, the zero-crossing pulse width $T_Z$ denotes the length of time when the zero-crossing signal 208 is logic high.

The rectified voltage $V_{RECT}$ 106 shown in FIG. 2A is the ac input voltage $V_{AC}$ 102 with a positive magnitude, or mathematically: $V_{RECT}=|V_{AC}|=|V_P \sin(2\pi f_L t)|$. The time during which the value of the rectified voltage $V_{RECT}$ 106 is near zero voltage corresponds to when the value of the ac input voltage $V_{AC}$ 102 is close to crossing zero voltage hence the term "zero-crossing." In other words, detecting when the rectified voltage $V_{RECT}$ 106 is near zero voltage corresponds to detecting when the ac input voltage $V_{AC}$ 102 crosses zero voltage. As shown in FIG. 2B, when the rectified voltage $V_{RECT}$ 106 is less than the zero-crossing voltage threshold $V_{ZC}$ 204 the zero-crossing signal 208 pulses high to indicate the zero-crossing condition to the controller 138. In other words, when $-V_{ZC}<V_{AC}(t)<V_{ZC}$, the zero-crossing signal 208 pulses high to indicate the zero-crossing condition. For embodiments of the present invention, the controller 138 utilizes on-time extension of the switch S1 114 to determine the zero-crossing of the ac input voltage $V_{AC}$ 102

Figure 3:
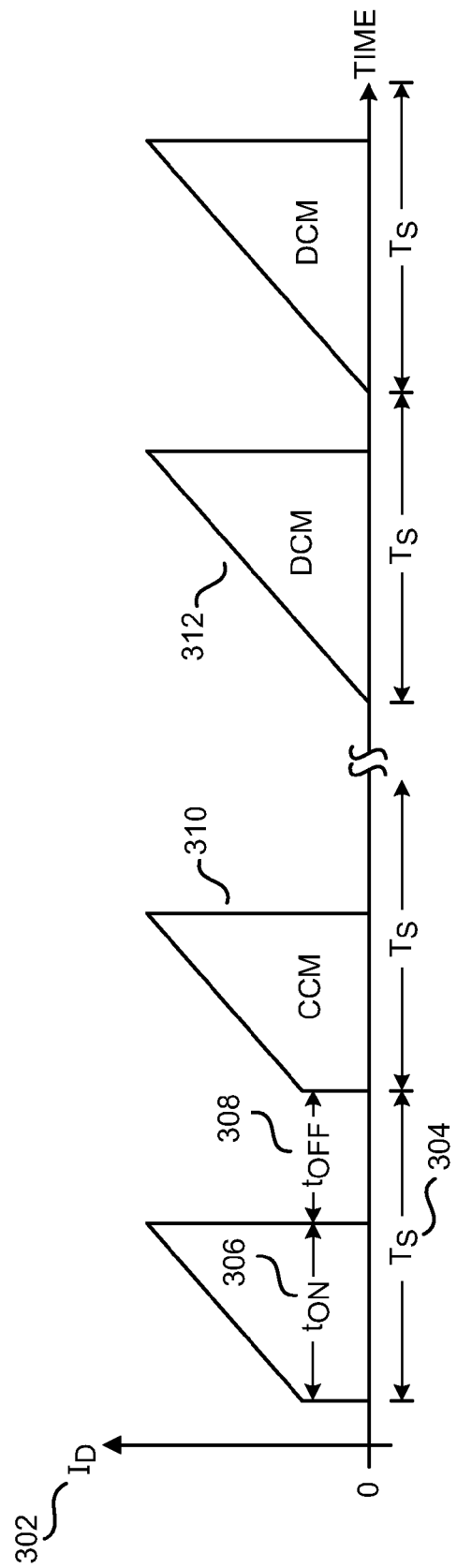
FIG. 3 is a diagram illustrating an example switch current waveform of a switching power supply operating in continuous conduction mode (CCM) and discontinuous conduction mode (DCM) in accordance with an embodiment of the present invention.

The switch current of various modes of operation is illustrated in FIG. 3. A diagram of an example switch current waveform of the switched mode power supply of FIG. 1 is illustrated including switching period $T_S$ 304, a switch on-time $t_{ON}$ 306, a switch off-time $t_{OFF}$ 308, trapezoidal shape 310 and triangular shape 312. FIG. 3 illustrates the general waveforms of the switch current $I_D$ 302 with respect to time when the controller is operating in both continuous conduction mode (CCM) and discontinuous conduction mode (DCM). The general waveforms of switch current $I_D$ 302 represent examples of the switch current $I_D$ 144 illustrated in FIG. 1.

During any switching period $T_S$ 304, switch S1 114 may conduct in response to the drive signal 140 from the controller 138 to regulate the output quantity $U_O$. The switching period $T_S$ 304 may be separated into two sections of time: switch on-time $t_{ON}$ 306 and switch off-time $t_{OFF}$ 308. Switch on-time $t_{ON}$ 306 denotes the portion of the switching period $T_S$ 304 where the switch S1 114 may conduct. Switch off-time $t_{OFF}$ 308 denotes the remaining portion of the switching period $T_S$ 304 when the switch S1 114 cannot conduct. The current waveform of FIG. 3 illustrates two fundamental modes of operation. The trapezoidal shape 310 is characteristic of continuous conduction mode (CCM) whereas the triangular shape 312 is characteristic of discontinuous conduction mode (DCM). During CCM, the switch current $I_D$ 302 is substantially non-zero immediately after the start of the switch on-time $t_{ON}$ 306. At DCM, the switch current $I_D$ 302 is substantially zero immediately after the beginning of the switch on-time $t_{ON}$ 306. During the switch off-time $t_{OFF}$ 308, the switch current $I_D$ 302 is substantially zero for both CCM and DCM. The switching power supply 100 in accordance with embodiments of the present invention may operate in either CCM or DCM.

Figure 4A:
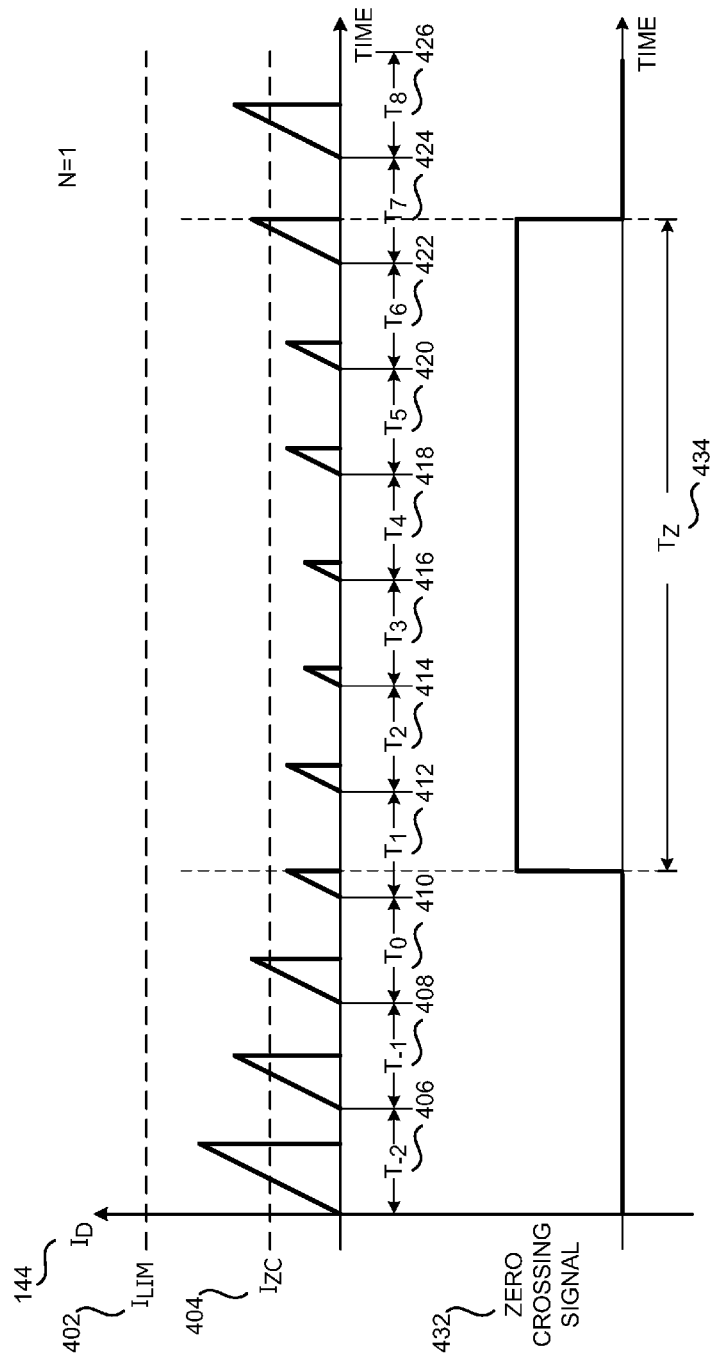
FIG. 4A is a diagram illustrating an example switch current waveform of a switching power supply operating in DCM and corresponding zero-crossing signal in accordance with an embodiment of the present invention.

Referring next to FIG. 4A, a diagram of an example switch current waveform and resultant zero-crossing signal 432 is illustrated including switch current $I_D$ 144, a current limit threshold $I_{LIM}$ 402, a zero-crossing current threshold $I_{ZC}$ 404, switching cycles $T_{-2}$ 406 through $T_8$ 426, and zero-crossing pulse width $T_Z$ 434. FIG. 4A demonstrates one example of the general waveform of switch current $I_D$ 144 over time when the power supply 100 is operating in discontinuous conduction mode (DCM). In general, each of the switching cycles $T_{-2}$ 406 through $T_8$ 426 has a switching period of $T_S$ 304. In some embodiments of the present invention, the switching period of $T_S$ 304 may be a constant length of time. In other embodiment of the present invention, the controller 138 may vary the length of the switching period $T_S$ 304. In further embodiments of the present invention, the switching period $T_S$ 304 (and hence the switching frequency $f_S$ where $$f_S = \frac{1}{T_S})$$

and the intended switch on-time $t_{ON}$ 306 are all maintained constant for one half line cycle 202.

For embodiments of the present invention, the controller 138 utilizes on-time extension of the switch S1 114 to determine when the ac input voltage $V_{AC}$ 102 has crossed zero voltage. FIG. 4A illustrates an example of the switch current $I_D$ 144 over several switching cycles $T_{-2}$ 406 through $T_8$ 426.

The current limit threshold $I_{LIM}$ 402 determines the maximum current permitted of the switch S1 114. If the switch current $I_D$ 144 reaches the current limit threshold $I_{LIM}$ 402, the switch S1 114 turns off for the remainder of the switching cycle. When the switch current $I_D$ 144 does not reach the zero-crossing current threshold $I_{ZC}$ 404 by a certain amount of time, as will be discussed further with respect to FIG. 5, a possible zero-crossing condition may exist.

Figure 4B:
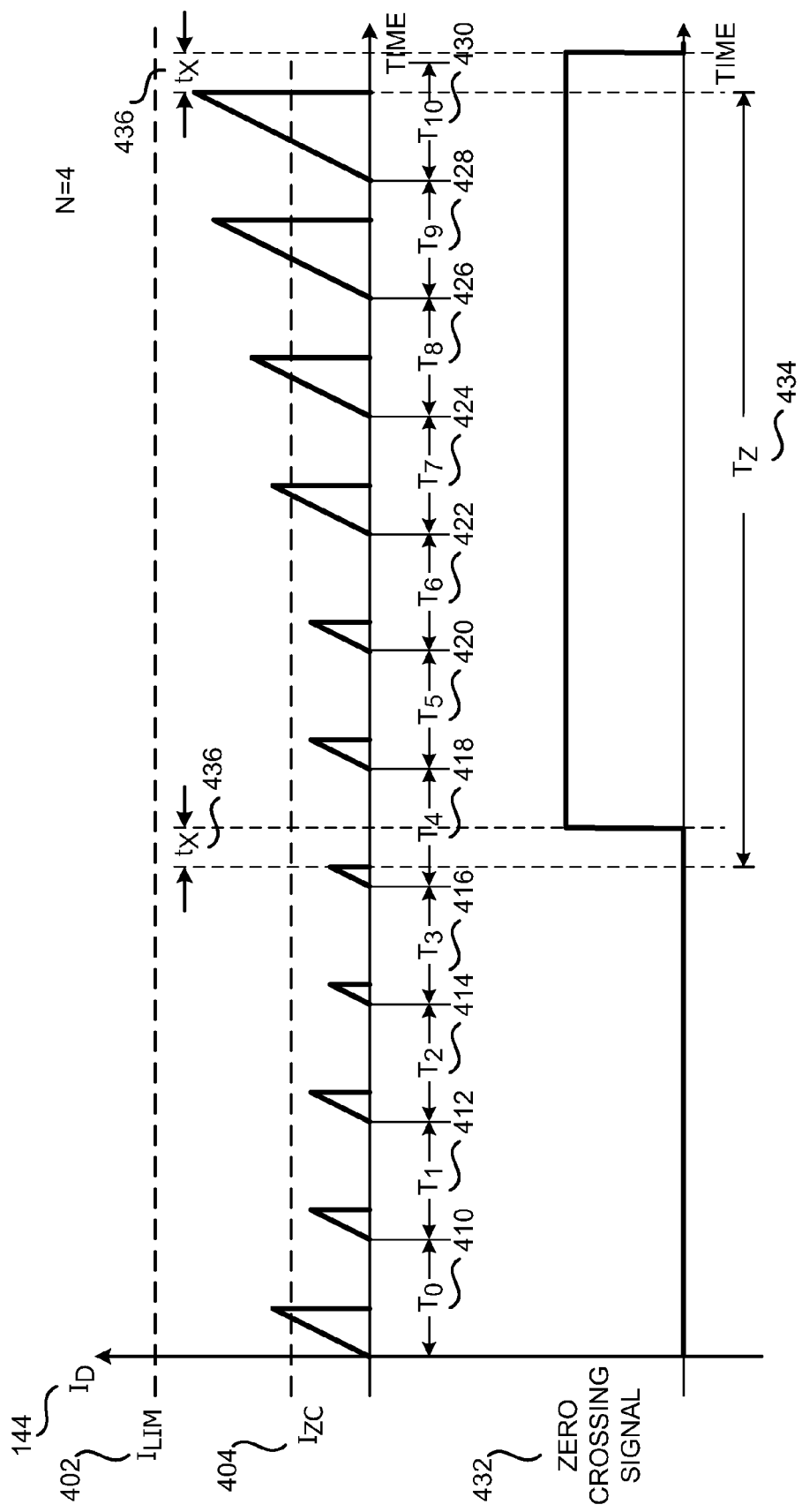
FIG. 4B is a diagram illustrating another example of the switch current waveform of a switching power supply operating in DCM and corresponding zero-crossing signal in accordance with an embodiment of the present invention.

It should be appreciated that N is the number of consecutive switching cycles which the controller 138 detects as a possible zero-crossing condition before determining that the zero-crossing condition does exist and the zero-crossing signal 432 changes from a state indicating no zero-crossing condition to a state which indicates the zero-crossing condition. In addition, when the zero-crossing signal 432 is indicating that the zero-crossing condition exists, the controller waits N consecutive switching cycles to allow the controller 138 to decide that the zero-crossing condition does not exist before the controller 138 changes the state of the zero-crossing signal 432 to indicate no zero-crossing condition. The controller 138 may wait the N consecutive switching cycles to account for any noise ringing which could lead to a false detection of the zero-crossing condition. For example, if N is equal to 4 (as shown in FIG. 4B), the controller 138 determines that the zero-crossing condition exists when a possible zero-crossing condition occurs for 4 consecutive switching cycles. In another example, if N is equal to 1 (as shown in FIG. 4A), the controller 138 determines that the zero-crossing condition exists at the first instance of a possible zero-crossing condition. The value of N may be chosen in part due to the amount of expected noise at the input of the power supply 100. The lower the value of N, the more quickly the controller 138 determines that the zero-crossing condition does or does not exist, however, the determination of the zero-crossing condition may be more susceptible to noise at the input of the power supply 100. As such, the zero-crossing signal 432 may falsely indicate a zero-crossing condition or falsely indicate no zero-crossing condition of the ac input voltage $V_{AC}$ 102. However, the value of N should not be so large that the controller 138 can not detect that the zero-crossing condition exists because the rectified voltage $V_{RECT}$ 106 has fallen below the zero-crossing voltage threshold $V_{ZC}$ 204 and then risen above the zero-crossing voltage threshold $V_{ZC}$ 204 before the value of N is reached.

In one embodiment, a logic low value of the zero-crossing signal 432 indicates no zero-crossing condition exists while a logic high value of the zero-crossing signal 432 indicates that the zero-crossing condition exists. In another embodiment, a logic high value of the zero-crossing signal 432 indicates no zero-crossing condition exists while a logic low value of the zero-crossing signal 432 indicates that the zero-crossing condition exists.

For the example shown in FIG. 4A, N is equal to 1 and the controller 138 determines that the zero-crossing condition exists at the first instance of a possible zero-crossing condition and changes the state of the zero-crossing signal 432 during the same switching cycle. In the example of FIG. 4A, the zero-crossing signal 432 changes to a state indicating the zero-crossing condition when the switch S1 114 turns off and switch current $I_D$ 144 falls to zero current. At switching cycles $T_{-2}$ 406, $T_{-1}$ 408, and $T_0$ 410, the switch current $I_D$ 144 exceeds the zero-crossing current threshold $I_{ZC}$ 404 and as a result no zero-crossing condition is detected by the controller 138. For the example of FIG. 4A, when there is no zero-crossing condition, the zero-crossing signal 432 is a logic low value. However, at switching cycle $T_1$ 412, the switch current $I_D$ 144 does not reach the zero-crossing current threshold $I_{ZC}$ 404 within a certain amount of time. Since N is equal to 1 in the example of FIG. 4A, the controller 138 determines that the zero-crossing condition exists for the ac input voltage $V_{AC}$ 102. As a result the zero-crossing signal 432 changes to the state which indicates the zero-crossing condition during switching cycle $T_1$ 412.

For switching cycles $T_2$ 414 through $T_6$ 422, the switch current $I_D$ 144 still does not reach the zero-crossing current threshold $I_{ZC}$ 404 and the controller 138 determines that the zero-crossing condition of the ac input voltage $V_{AC}$ 102 continues to exist. As a result the zero-crossing signal 432 remains at the logic high value. At switching cycle $T_7$ 424, the switch current $I_D$ 144 exceeds the zero-crossing current threshold $I_{ZC}$ 404 and the controller 138 determines that no zero-crossing condition exists. Since N is equal to 1, the zero-crossing signal 432 changes to the logic low value during switching cycle $T_7$ 424. For the example of FIG. 4A, the zero-crossing signal 432 changes to a state indicating no zero-crossing condition when the switch S1 114 turns off during switching cycle $T_7$ 424 and switch current $I_D$ 144 falls to zero current. As shown in FIG. 4A, the zero-crossing pulse width $T_Z$ 434 is the length of time which the zero-crossing signal 432 indicates the zero-crossing condition.

Referring next to FIG. 4B, another diagram of the example switch current waveform and resultant zero-crossing signal 432 is illustrated including switch current $I_D$ 144, current limit threshold $I_{LIM}$ 402, zero-crossing current threshold $I_{ZC}$ 404, switching cycles $T_0$ 410 through $T_{10}$ 430, zero-crossing pulse width $T_Z$ 434, and delay time $t_X$ 436. FIG. 4B demonstrates one example of the general waveform of switch current $I_D$ 144 over time when the power supply 100 is operating in DCM. FIG. 4B also illustrates the same switch current $I_D$ 144 as shown in FIG. 4A, however, for FIG. 4B N is equal to 4 and FIG. 4B shows switching cycles $T_0$ through $T_{10}$ (rather than switching cycles $T_{-2}$ through $T_8$ as shown in FIG. 4A). The controller 138 waits 4 consecutive switching cycles after a possible zero-crossing condition before determining that the zero-crossing condition does exist and the zero-crossing signal 432 changes state to indicate the zero-crossing condition. In addition, when the zero-crossing signal 432 indicates the zero-crossing condition exists, the controller 138 waits 4 consecutive switching cycles with no zero-crossing condition before the controller 138 changes the state of the zero-crossing signal 432 to indicate no zero-crossing condition. The controller 138 waits for 4 consecutive switching cycles to account for any noise ringing and to ensure that the zero-crossing condition does exist. Although FIG. 4B illustrates N as being equal to 4, N may be any positive integer. However, the value of N should not be so large that the controller 138 can not detect that the zero-crossing condition exists because the switch current $I_D$ 144 has fallen below the zero-crossing current threshold $I_{ZC}$ 404 and then risen above the zero-crossing current threshold $I_{ZC}$ 404 before the value of N is reached.

At switching cycle $T_0$ 410, the switch current $I_D$ 144 exceeds the zero-crossing current threshold $I_{ZC}$ 404 and as a result the controller 138 does not determine the zero-crossing condition exists and the zero-crossing signal 432 remains at the logic low value. During switching cycle $T_1$ 412, the switch current $I_D$ 144 does not reach the zero-crossing current threshold $I_{ZC}$ 404 within a certain amount of time and the controller 138 determines that a possible zero-crossing condition exists, however, the zero-crossing signal 432 still remains at the logic low value since the controller 138 waits 4 consecutive switching cycles of possible zero-crossing conditions before determining that the zero-crossing condition exists. From the example of FIG. 4B, switch current $I_D$ 144 also does not reach the zero-crossing current threshold $I_{ZC}$ 404 within a certain amount of time for switching cycles $T_2$ 414 through $T_4$ 418. Switching cycle $T_4$ 418 is the fourth consecutive switching cycle which a possible zero-crossing condition exists. As such the controller 138 determines that the zero-crossing condition does exist for the ac input voltage $V_{AC}$ 102 and the zero-crossing signal 432 changes to the state which indicates that the zero-crossing condition exists. For the example shown in FIG. 4B, the zero-crossing signal 432 transitions from the logic low value to the logic high value. However, the zero-crossing signal 432 does not transition to the logic high value until the end of the delay time $t_X$ 436. The delay time $t_X$ 436 denotes the length of time between the controller 138 determining the zero-crossing condition does exist and the controller 138 updating the zero-crossing signal 432. In one embodiment, the delay time $t_X$ 436 for the zero-crossing signal to update may be due to the filter used to implement the number N. In a further embodiment, the delay time $t_X$ 436 may delay the zero-crossing signal 432 from updating until the next switching cycle. Referring back to FIG. 4A, the delay time $t_X$ 436 is substantially equal to zero. For embodiments of the present invention, a delay time $t_X$ 436 of zero may be preferred. However, embodiments of controller 138 that include a delay time $t_X$ 436 of zero may require additional circuitry (not shown). Thus, some embodiments of controller 138 may include a non-zero delay time $t_X$ 436 to reduce costs and/or circuit complexity.

For switching cycles $T_5$ 420 and $T_6$ 422, the switch current $I_D$ 144 still does not reach the zero-crossing current threshold $I_{ZC}$ 404 and the controller determines that the zero-crossing condition of the ac input voltage $V_{AC}$ 102 continues to exist and the zero-crossing signal 432 remains at the logic high value. At switching cycle $T_7$ 424, the switch current $I_D$ 144 exceeds the zero-crossing current threshold $I_{ZC}$ 404 within a certain period of time indicating that the zero-crossing condition of the ac input voltage $V_{AC}$ 102 may no longer exist, however, the controller 138 waits 4 consecutive switching cycles which the switch current $I_D$ 144 indicates that the zero-crossing condition may no longer exist before determining that the ac input voltage $V_{AC}$ 102 is no longer in the zero-crossing condition. For switching cycles $T_8$ 426 through $T_{10}$ 430, the switch current $I_D$ exceeds the zero-crossing current threshold $I_{ZC}$ 404 within a certain period of time. Switching cycle $T_{10}$ 430 is the fourth consecutive switching cycle which the zero-crossing condition may no longer exist and the controller 138 determines that there is no zero-crossing condition. As a result the zero-crossing signal 432 changes to the state which indicates that no zero-crossing condition exists. However, the zero-crossing signal 432 does not transition to the logic low value until the end of the delay time $t_X$ 436. The delay time $t_X$ 436 denotes the length of time between the controller 138 determining that there is no zero-crossing condition and the controller 138 updating the zero-crossing signal 432. In a further embodiment, the delay time $t_X$ 436 may delay the zero-crossing signal 432 from updating until the next switching cycle. As shown in FIG. 4B, the zero-crossing pulse width $T_Z$ 434 is the length of time which the zero-crossing signal 432 indicates the zero-crossing condition exists.

Figure 5:
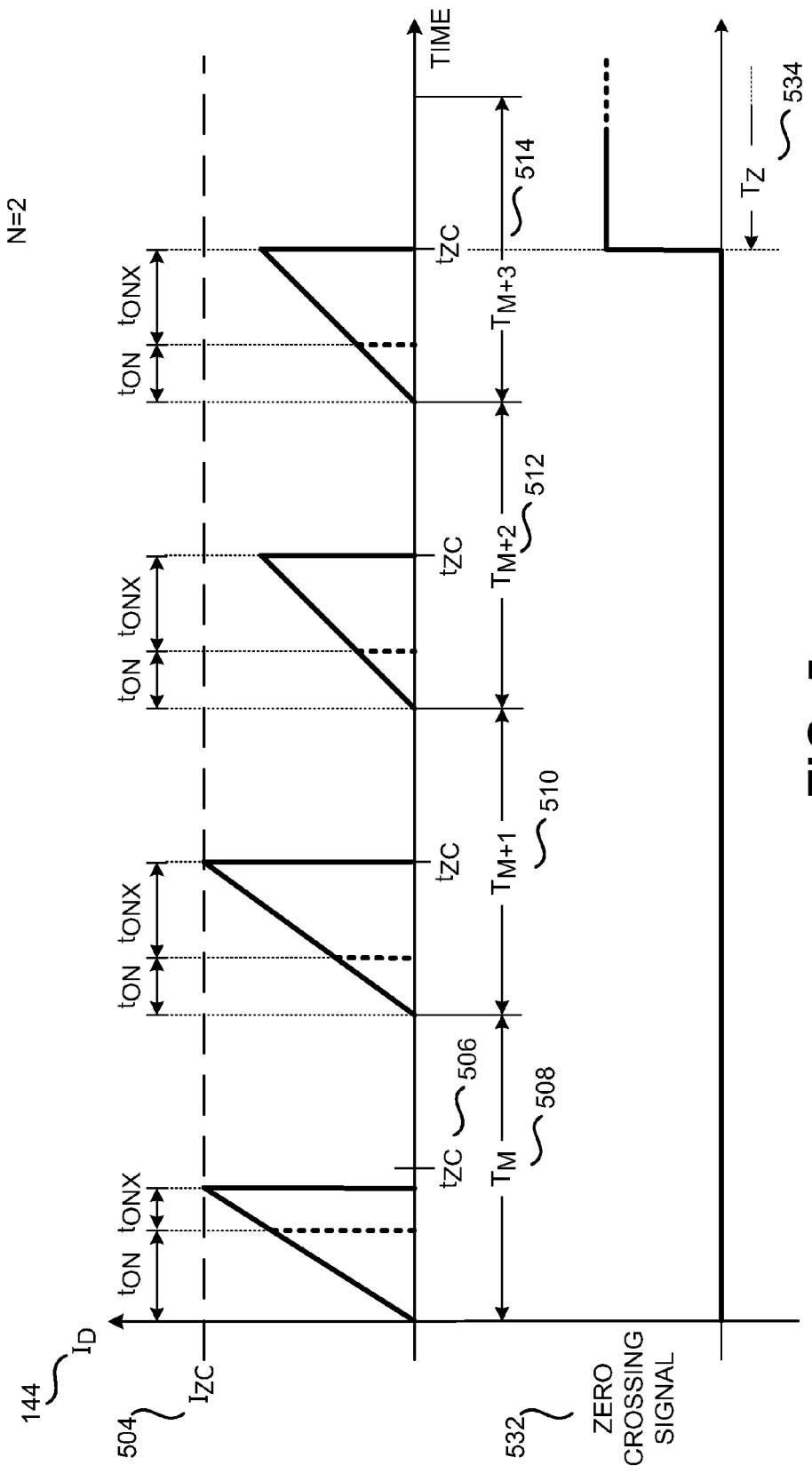
FIG. 5 is a diagram illustrating an example switch current waveform and corresponding zero-crossing signal in accordance with an embodiment of the present invention.

Referring next to FIG. 5, another diagram of the example switch current waveform and resultant zero-crossing signal 532 is illustrated including switch current $I_D$ 144, a zero-crossing current threshold $I_{ZC}$ 504, a zero-crossing time threshold $t_{ZC}$ 506, switching cycles $T_M$ 508 through $T_{M+3}$ 514, and zero-crossing pulse width $T_Z$ 534. In addition, during each switching cycle $T_M$ 508 through $T_{M+3}$ 514, there is an on-time $t_{ON}$ and an extended on-time $t_{ONX}$ of the switch S1 114. In general, each of the switching cycles $T_M$ 508 through $T_{M+3}$ 514 has a switching period of $T_S$ 304. In some embodiments of the present invention, the switching period of $T_S$ 304 may be a constant length of time. In other embodiment of the present invention, the controller 138 may vary the length of the switching period $T_S$ 304. For the example zero-crossing signal 532 shown in FIG. 5, the value of N is 2 and the delay time $t_X$ is substantially equal to zero.

In one embodiment of the present invention, the controller 138 utilizes on-time extension of the switch S1 114 to determine if the zero-crossing condition exists for the ac input voltage $V_{AC}$ 102. As will be further discussed, the controller 138 also utilizes on-time extension of the switch S1 114 as a non-dissipative integrated bleeder circuit. The controller 138 determines that the zero-crossing condition exists when the switch current $I_D$ 144 does not reach the zero-crossing current threshold $I_{ZC}$ 504 within the zero-crossing time threshold $t_{ZC}$ 506. When the switch current $I_D$ 144 does not reach the zero-crossing current threshold $I_{ZC}$ 504 during the initial on-time $t_{ON}$ of the switch S1 114, the controller 138 extends the on-time $t_{ON}$ until the zero-crossing current threshold $I_{ZC}$ 504 is reached or until the extended on-time $t_{ONX}$ reaches the zero-crossing time threshold $t_{ZC}$ 506. The amount of time which the on-time $t_{ON}$ is extended by is referred to as the extended on-time $t_{ONX}$. For some embodiments, the zero-crossing time threshold $t_{ZC}$ 506 is substantially equal to 5 μs. When choosing the value of the zero-crossing time threshold $t_{ZC}$ 506, the zero-crossing time threshold $t_{ZC}$ 506 should be longer than the smallest intended on-time $t_{ON}$ yet not be significantly longer than the switching period of $T_S$ 304. In general, the controller 138 may more accurately sense the switch current $I_D$ 144 with larger values of the zero-crossing time threshold $t_{ZC}$ 506.

At switching cycle $T_M$ 508, the switch current $I_D$ 144 does not reach the zero-crossing current threshold $I_{ZC}$ 504 within the initial on-time $t_{ON}$ of the switch S1 114. Instead of turning the switch S1 114 off, the switch S1 114 remains on and the on-time $t_{ON}$ of the switch is extended until the switch current $I_D$ 144 reaches the zero-crossing current threshold $I_{ZC}$ 504 or the total on-time (e.g., the sum of the on-time $t_{ON}$ and the extended on-time $t_{ONX}$) reaches the zero-crossing time threshold $t_{ZC}$ 506. For switching cycle $T_M$ 508, the on-time $t_{ON}$ is extended by extended on-time $T_{ONX}$, however, the switch current $I_D$ 144 reaches the zero-crossing current threshold $I_{ZC}$ 504 before the sum of the on-time $t_{ON}$ and the extended on-time $t_{ONX}$ reaches the zero-crossing time threshold $t_{ZC}$ 506. As a result the switch S1 114 is turned off when the switch current $I_D$ 144 reaches the zero-crossing current threshold $I_{ZC}$ 504 and the switch current $I_D$ 144 falls to substantially zero. The controller 138 does not detect the zero-crossing condition and as a result the zero-crossing signal 532 indicates no zero-crossing condition.

At switching cycle $T_{M+1}$ 510, the switch current $I_D$ 144 does not reach the zero-crossing current threshold $I_{ZC}$ 504 within the initial on-time $t_{ON}$ and the controller 138 extends the on-time $t_{ON}$ by extended on-time $t_{ONX}$. As illustrated, the switch current $I_D$ 144 reaches the zero-crossing current threshold $I_{ZC}$ 504 during the extended on-time $t_{ONX}$. Unlike switching cycle $T_M$ 508, the switch current $I_D$ 144 reaches the zero-crossing current threshold $I_{ZC}$ 504 when the sum of the on-time $t_{ON}$ and the extended on-time $t_{ONX}$ substantially equals the zero-crossing time threshold $t_{ZC}$ 506. The controller 138 does not detect the zero-crossing condition and the zero-crossing signal 532 remains at the logic low value.

At switching cycle $T_{M+2}$ 512, the switch current $I_D$ 144 does not reach the zero-crossing current threshold $I_{ZC}$ 504 within the initial on-time $t_{ON}$ and the controller 138 extends the on-time $t_{ON}$ by extended on-time $t_{ONX}$. As mentioned above, the controller 138 turns the switch S1 114 off when the extended on-time $t_{ONX}$ reaches the zero-crossing time threshold $t_{ZC}$ 506 and the switch current $I_D$ 144 is less than the zero-crossing current threshold $I_{ZC}$ 504. In the example shown in FIG. 5, the switch current $I_D$ 144 does not reach the zero-crossing current threshold $I_{ZC}$ 504 within the initial on-time $t_{ON}$ and the controller 138 extends the on-time of the switch S1 114. The on-time $t_{ON}$ is extended until the switch current $I_D$ 144 reaches the zero-crossing current threshold $I_{ZC}$ 504 or the extended on-time $t_{ONX}$ reaches the zero-crossing time threshold $t_{ZC}$ 506. For switching cycle $T_{M+2}$ 512, the extended on-time $t_{ONX}$ reaches the zero-crossing time threshold $t_{ZC}$ 506 before the switch current 144 reaches the zero-crossing current threshold $I_{ZC}$ 504. As a result, the controller 138 determines that a possible zero-crossing condition may exist. However, the zero-crossing signal 532 does not change states since the controller 138 waits 2 consecutive switching cycles of possible zero-crossing conditions before determining that the zero-crossing condition exists.

At switching cycle $T_{M+3}$ 514, the switch current $I_D$ 144 again does not reach the zero-crossing current threshold $I_{ZC}$ 504 within the initial on-time $t_{ON}$ and the controller 138 extends the on-time $t_{ON}$ by extended on-time $t_{ONX}$. Similar to switching cycle $T_{M+2}$ 512, the switch current $I_D$ 144 does not reach the zero-crossing current threshold $I_{ZC}$ 504 before the extended on-time $t_{ONX}$ reaches the zero-crossing time threshold $t_{ZC}$ 506. Switching cycle $T_{M+3}$ 514 is, thus, the second consecutive switching cycle with a possible zero-crossing condition. As a result the controller 138 determines that the zero-crossing condition exists and the zero-crossing signal 532 changes state.

The zero-crossing current threshold $I_{ZC}$ 504 and the zero-crossing time threshold $t_{ZC}$ 506 are chosen to correspond to the zero-crossing voltage threshold $V_{ZC}$ 204. As mentioned above, the controller 138 detects the zero-crossing condition when the switch current $I_D$ 144 does not reach the zero-crossing current threshold $I_{ZC}$ 504 by the zero-crossing time threshold $t_Z$ 506. The zero-crossing current threshold $I_{ZC}$ 504 and the zero-crossing time threshold $t_Z$ 506 are fixed such that the zero-crossing condition corresponds to the value of the rectified voltage $V_{RECT}$ 106 falling below the zero-crossing voltage threshold $V_{ZC}$ 204. In other words, the zero-crossing current threshold $I_{ZC}$ 504 and the zero-crossing time threshold $t_Z$ 506 are fixed such that the zero-crossing condition corresponds to the value of the ac input voltage $V_{AC}$ 102 falling between the positive zero-crossing voltage threshold $V_{ZC}$ 204 and the negative zero-crossing voltage threshold $V_{ZC}$ 204, or mathematically:

$$-V_{ZC} < V_{AC}(t) < V_{ZC}.$$

The relationship between voltage and current of the switch S1 114 when the switch S1 114 is ON may be expressed as:

$$V(t) = L_P \frac{di(t)}{dt},$$

where $L_P$ is the inductance of the primary winding 110. For power supply 100 operating in DCM, this relationship during any switching cycle may be further expressed as:

$$V_{AC} = L_P \frac{I_{PEAK}}{t_{ON}},$$

where $I_{PEAK}$ is the peak value of the switch current $I_D$ 144. However, in one switching cycle the value of $V_{AC}$ may be considered a constant since the on-time $t_{ON}$ is small relative to the period of the input voltage $V_{AC}$ 102. As mentioned above, the zero-crossing current threshold $I_{ZC}$ 504 and the zero-crossing time threshold $t_Z$ 506 are fixed and may be chosen to correspond to the zero-crossing voltage threshold $V_{ZC}$ 204 utilizing the relationship between voltage and current of the switch S1 114 when the switch S1 114 is ON in DCM, or mathematically:

$$V_{ZC} = L_P \frac{I_{ZC}}{t_{ZC}}.$$

The longer the switch S1 114 is ON, the more charge is removed from the filter capacitor $C_F$ 120. Thus, the on-time extension utilized by the controller 138 to determine the zero-crossing time threshold $t_{ZC}$ 506 may remove more charge from the filter capacitor $C_F$ 120 than a controller without on-time extension. As a result the discharging of the filter capacitor $C_F$ 120 helps to pull down the voltage at the primary winding 110 which may help the controller 138 with power factor correction (PFC) and to detect the zero-crossing of the ac input voltage $V_{AC}$ 102. As mentioned above, in conventional switching power supplies a bleeder circuit is provided to facilitate the discharging the filter capacitor $C_F$ 120 of power supply 100 and help pull down the voltage at the primary winding 110 of energy transfer element T1 108. However, conventional bleeder circuits are typically external to an integrated circuit controller. Circuitry external to the integrated circuit 146 of the controller 138 may add unwanted cost to the switched mode power supply. In addition, the typical bleeder circuit (i.e. a resistor) dissipates energy in the form of heat and lowers the efficiency of the switched mode power supply. The on-time extension utilized by the controller 138 provides the power supply 100 with a bleeder circuit integrated with the controller 138. Thus, on-time extension block 904 may be referred to herein as a bleeder circuit that is internal to (i.e., integrated within) controller 138. In addition, because the on-time extension allows more current to flow through the primary winding, the energy which would have been dissipated by a traditional bleeder is transferred to the output of the power supply 100. As such, the on-time extension utilized by the controller 138 acts as a non-dissipative bleeder circuit. In addition, when the switching period $T_S$ 304 (and hence the switching frequency $f_S$ where $$f_S = \frac{1}{T_S})$$

and the intended switch on-time $t_{ON}$ are constant for one half line cycle 202, on-time extension by the controller 138 also allows for adaptive bleeding since the value of the extended on-time $t_{ONX}$ may vary. As mentioned above, for a power supply 100 operating in DCM, the relationship between voltage and current of switch S1 114 may be expressed as:

$$V_{AC} = L_P \frac{I_{PEAK}}{t_{ON}}.$$

When the intended switch on-time $t_{ON}$ is constant for an entire half line cycle 202, the peak value of the switch current $I_{PEAK}$ is dependant upon the value of ac input voltage $V_{AC}$ 102. As such, the higher values of the ac input voltage $V_{AC}$ 102, the more likely the peak value of the switch current $I_{PEAK}$ is above the zero-crossing current threshold $I_{ZC}$ 504. In addition, the higher the value of the ac input voltage $V_{AC}$ 102, the quicker the switch current $I_D$ 144 reaches the zero-crossing current threshold $I_{ZC}$ 504. Thus, controller 138 may provide adaptive bleeding by varying the amount of the extended on-time $t_{ONX}$ in response to the value of the ac input voltage $V_{AC}$ 102 such that the amount of bleeding provided by the on-time extension adapts with the value of the ac input voltage $V_{AC}$ 102.

Figure 6:
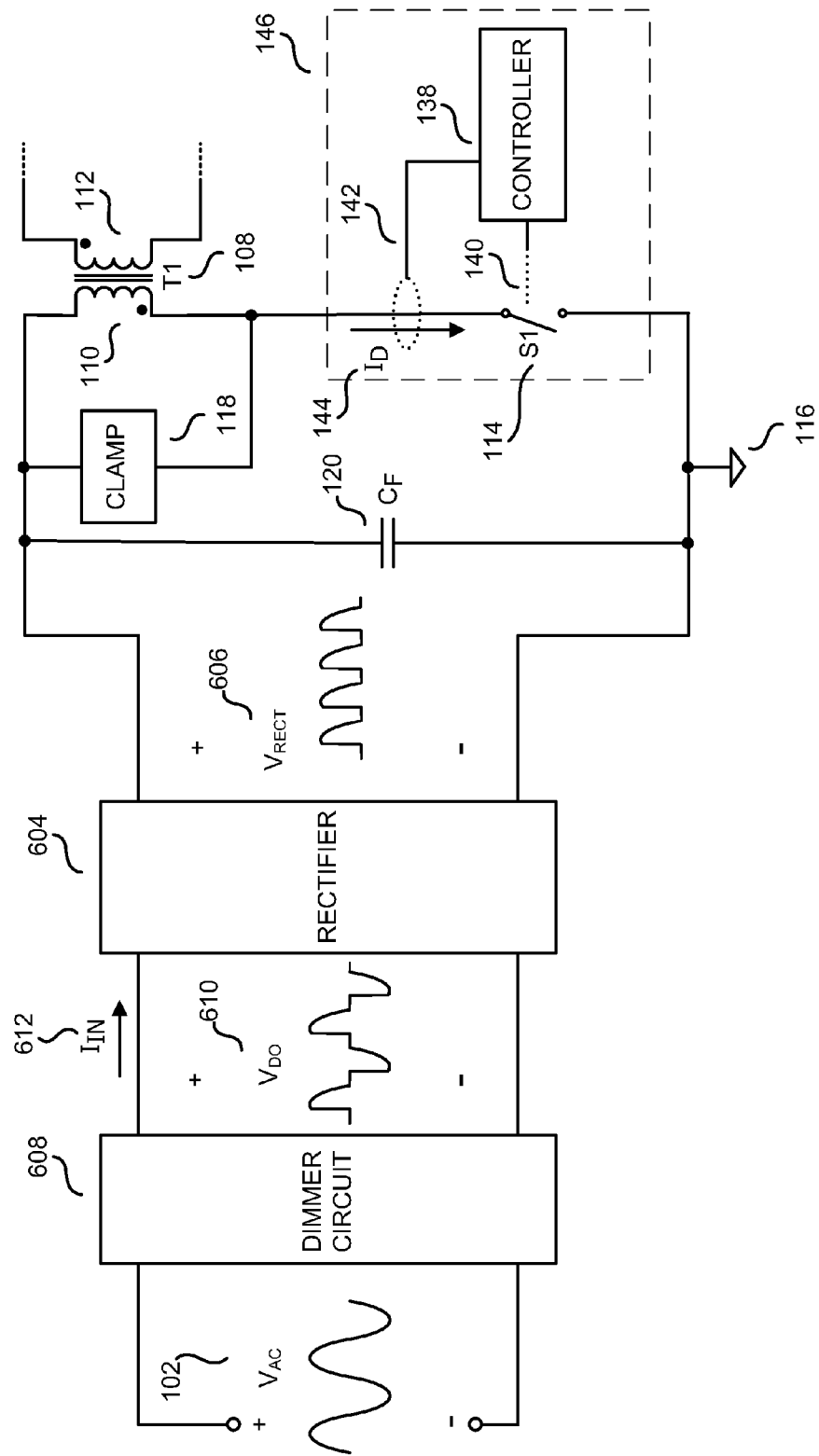
FIG. 6 is a functional block diagram illustrating an example switching power supply utilizing a dimmer circuit and a controller in accordance with an embodiment of the present invention.

Referring next to FIG. 6, a functional block diagram of an example switching power supply utilizing a dimmer circuit 608 is shown including ac input voltage $V_{AC}$ 102, energy transfer element T1 108, primary winding 110 of the energy transfer element T1 108, secondary winding 112 of the energy transfer element T1 108, switch S1 114, input return 116, clamp circuit 118, filter capacitor $C_F$ 120, controller 138, drive signal 140, current sense input signal 142, and switch current $I_D$ 144. In addition, the switching power supply further includes a rectifier 604, a rectified voltage $V_{RECT}$ 606, a dimmer circuit 608, a dimmer output voltage $V_{DO}$ 610, and an input current $I_N$ 612. It should be appreciated that the switching power supply shown in FIG. 6 is similar to the switching power supply 100 shown in FIG. 1 with the addition of dimmer circuit 608.

The energy transfer element T1 108, primary winding 110 of the energy transfer element T1 108, secondary winding 112 of the energy transfer element T1 108, switch S1 114, input return 116, clamp circuit 118, filter capacitor $C_F$ 120, controller 138, drive signal 140, current sense input signal 142, and switch current $I_D$ 144 couple and function as described above. The dimmer circuit 608 couples to the ac input voltage $V_{AC}$ 102 and produces the dimmer output voltage $V_{DO}$ 610. The dimmer circuit 608 further couples to the rectifier 604. Rectifier 604 receives the dimmer output voltage $V_{DO}$ 610 and outputs the rectified voltage $V_{RECT}$ 606. As shown in FIG. 6, the rectifier 604 is coupled across the filter capacitor $C_F$ 120. For some embodiments of the present invention, the rectifier 604 is a bridge rectifier as illustrated in FIG. 1.

Figure 7A:
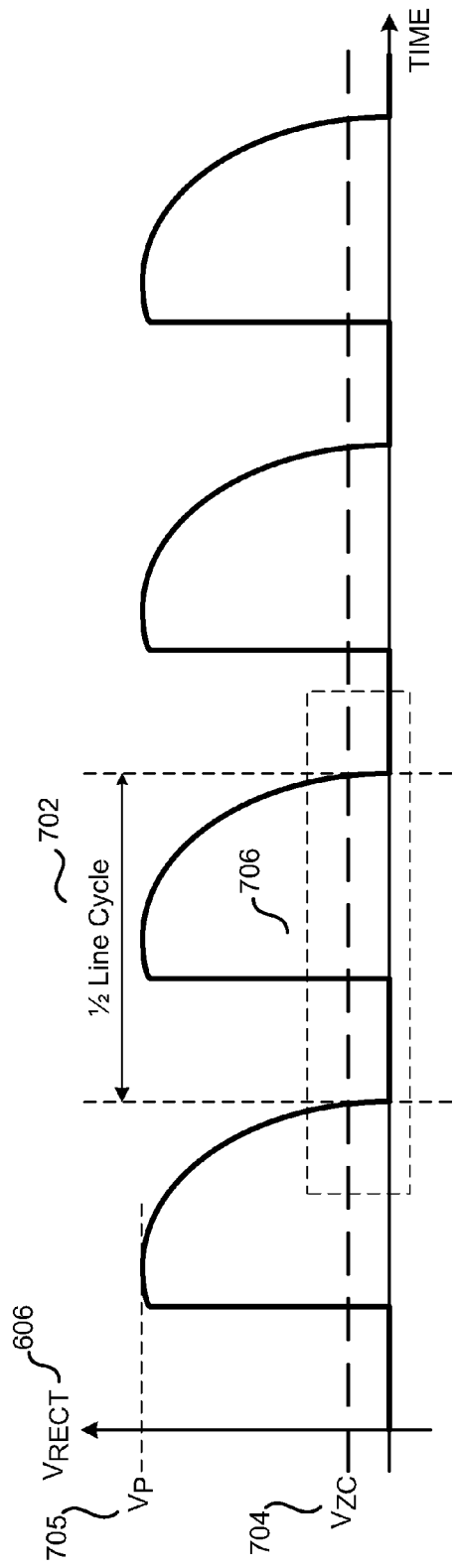
FIG. 7A is a diagram illustrating an example rectified input voltage waveform of the switching power supply of FIG. 6 in accordance with an embodiment of the present invention.
Figure 7B:
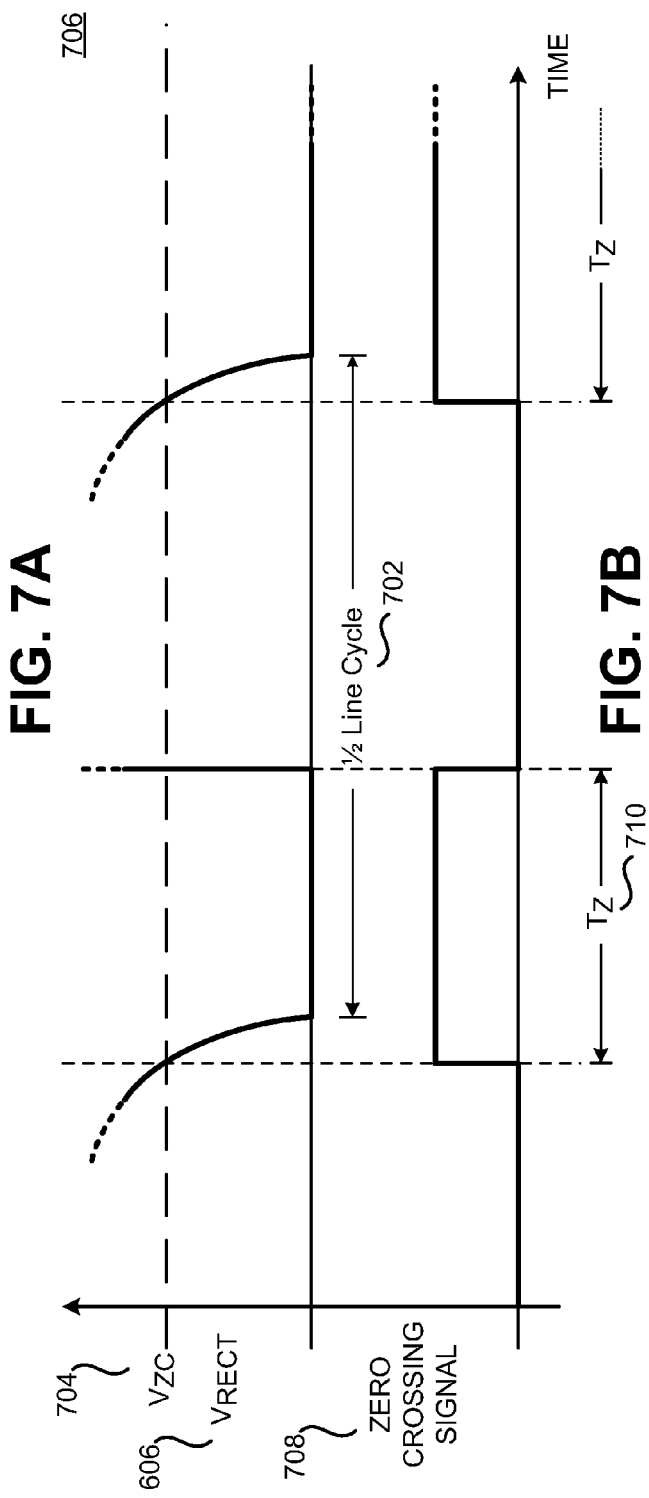
FIG. 7B is a diagram illustrating a portion of the example rectified input voltage of FIG. 7A and corresponding zero-crossing signal in accordance with an embodiment of the present invention.

The dimmer circuit 608 may be utilized when the load 126 coupled to the power supply is a light emitting diode (LED) array to limit the amount of power delivered to the power supply. As a result, the current delivered to the load of LED arrays is limited and the LED array dims. In one embodiment, the dimmer circuit 608 is a phase dimmer circuit. In another embodiment, a triac dimmer circuit may be utilized as the dimmer circuit 608. The triac dimmer disconnects the ac input voltage $V_{AC}$ 102 from the power supply when the ac input voltage $V_{AC}$ 102 crosses zero voltage. After a given amount of time, the triac dimmer reconnects the ac input voltage $V_{AC}$ 102 with the power supply. Depending on the amount of dimming wanted, the triac dimmer controls the amount of time the ac input voltage $V_{AC}$ 102 is disconnected from the power supply. In general, more dimming corresponds to a longer period of time during which the triac dimmer disconnects the ac input voltage $V_{AC}$ 102. For phase dimming applications of LEDs which utilize a triac dimmer circuit, the triac requires a minimum holding current to keep the triac itself from turning off. In accordance with embodiments of the present invention, the controller 138 utilizes the on-time extension of the switch S1 114 as a non-dissipative integrated bleeder circuit which helps ensure that that the current through the triac (i.e., $I_N$ 612) does not fall below the holding current of the triac. FIGS. 7A and 7B illustrate an example of the rectified voltage $V_{RECT}$ 606 and subsequent zero-crossing signal.

FIG. 7A illustrates the example waveform of the rectified voltage $V_{RECT}$ 606 shown in FIG. 6 including half line cycle 702, zero-crossing voltage threshold 704, a peak voltage $V_P$ 705, and portion 706. FIG. 7B illustrates the portion 706 of the rectified voltage $V_{RECT}$ 606 and the corresponding zero-crossing signal 708. The half line cycle 702, zero-crossing voltage threshold $V_{ZC}$ 704, and zero-crossing signal 708 are further examples of the half line cycle 202, zero-crossing voltage threshold $V_{ZC}$ 204, and zero-crossing signal 208 of FIGS. 2A and 2B.

As discussed above, the ac input voltage $V_{AC}$ 102 is a sinusoidal waveform with the period of the ac input voltage $V_{AC}$ 102 referred to as a full line cycle. Mathematically: $V_{AC}(t)=V_P \sin(2\pi f_L t)$. Where $V_P$ 705 is the peak voltage of the ac input voltage $V_{AC}$ 102 and $f_L$, is the frequency of the line input voltage. The rectified voltage $V_{RECT}$ 606 is the resultant output of the bridge rectifier 606 and the dimming circuit 608. For the example of FIG. 7A, the voltage level at the beginning of each half line cycle 702 of the rectified voltage $V_{RECT}$ 606 is substantially equal to zero, corresponding to when the dimmer circuit 608 disconnects the ac input voltage $V_{AC}$ 102 from the power supply. When the dimmer circuit 608 reconnects the ac input voltage $V_{AC}$ 102 to the power supply, the rectified voltage $V_{RECT}$ 606 substantially follows the positive magnitude of the ac input voltage $V_{AC}$ 102. Or mathematically: $V_{RECT}=|V_{DO}|$.

Similar to FIG. 2A, for some embodiments the zero-crossing voltage threshold $V_{ZC}$ 704 is substantially equal to zero. For other embodiments, the zero-crossing voltage threshold $V_{ZC}$ 704 is substantially one fifth of the peak voltage $V_P$ 705 of the rectified voltage $V_{RECT}$ 606. In one example, if the peak voltage $V_P$ 705 of the rectified voltage $V_{RECT}$ 606 is substantially equal to 125 V, the zero-crossing voltage threshold $V_{ZC}$ 704 is substantially equal to 25 V. In another embodiment, the zero-crossing voltage threshold $V_{ZC}$ 704 is substantially one fourth of the peak voltage $V_P$ 705 of the rectified voltage $V_{RECT}$ 606. It should be appreciated that as the value of the zero-crossing voltage threshold $V_{ZC}$ 704 is closer to zero voltage, the more accurate the zero-crossing signal 708. However, as discussed above with regards to FIG. 2A, a non-zero value may be chosen for the zero-crossing voltage threshold $V_{ZC}$ 704.

FIG. 7B illustrates the portion 706 of the rectified voltage $V_{RECT}$ 606 and the corresponding zero-crossing signal 708. Embodiments of the present invention utilize on-time extension of the switch S1 114 to produce the zero-crossing signal 708. When the rectified voltage $V_{RECT}$ 606 is less than the zero-crossing voltage threshold $V_{ZC}$ 704, the zero-crossing signal 708 indicates that the zero-crossing condition exists. The zero-crossing signal 708 is a rectangular pulse waveform with logic high and logic low sections. For the example illustrated in FIG. 7B, when the rectified voltage $V_{RECT}$ 606 is less than the zero-crossing voltage threshold $V_{ZC}$ 704, the value of the zero-crossing signal 708 is logic high. When the rectified voltage $V_{RECT}$ 606 is greater than the zero-crossing voltage threshold $V_{ZC}$ 704, the value of the zero-crossing signal 708 is logic low. For embodiments of the present invention, the controller 138 utilizes on-time extension of the switch S1 114 to determine the zero-crossing of the ac input voltage $V_{AC}$ 102

As mentioned above with respect to FIG. 2B, detecting when the rectified voltage $V_{RECT}$ 606 is near zero voltage corresponds to detecting when the ac input voltage $V_{AC}$ 102 crosses zero voltage. In comparing the zero-crossing signal 708 shown in FIG. 7B to the zero-crossing signal 208 shown in FIG. 2B, the zero-crossing pulse $T_Z$ 710 of FIG. 7B is longer than the zero-crossing pulse $T_Z$ 210 of FIG. 2B due to the disconnection of the ac input voltage $V_{AC}$ 102 by dimmer circuit 608. As mentioned above, the amount of dimming corresponds to the length of time during which the dimmer circuit 608 disconnects the ac input voltage $V_{AC}$ 102 from the power supply. The longer the dimmer circuit 608 keeps the ac input voltage $V_{AC}$ 102 disconnected from the power supply, the longer the rectified voltage $V_{RECT}$ 606 is substantially equal to zero voltage. As a result, the length of the zero-crossing pulse $T_Z$ 710 corresponds to the amount of dimming provided by the dimmer circuit 608.

Figure 8A:
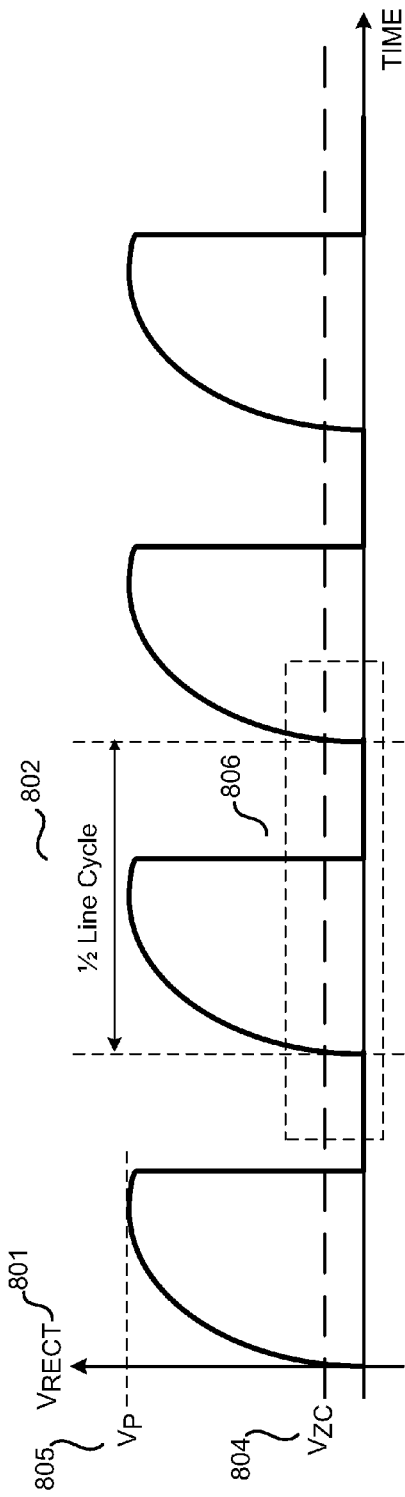
FIG. 8A is a diagram illustrating another example rectified input voltage waveform of a switching power supply in accordance with an embodiment of the present invention.
Figure 8B:
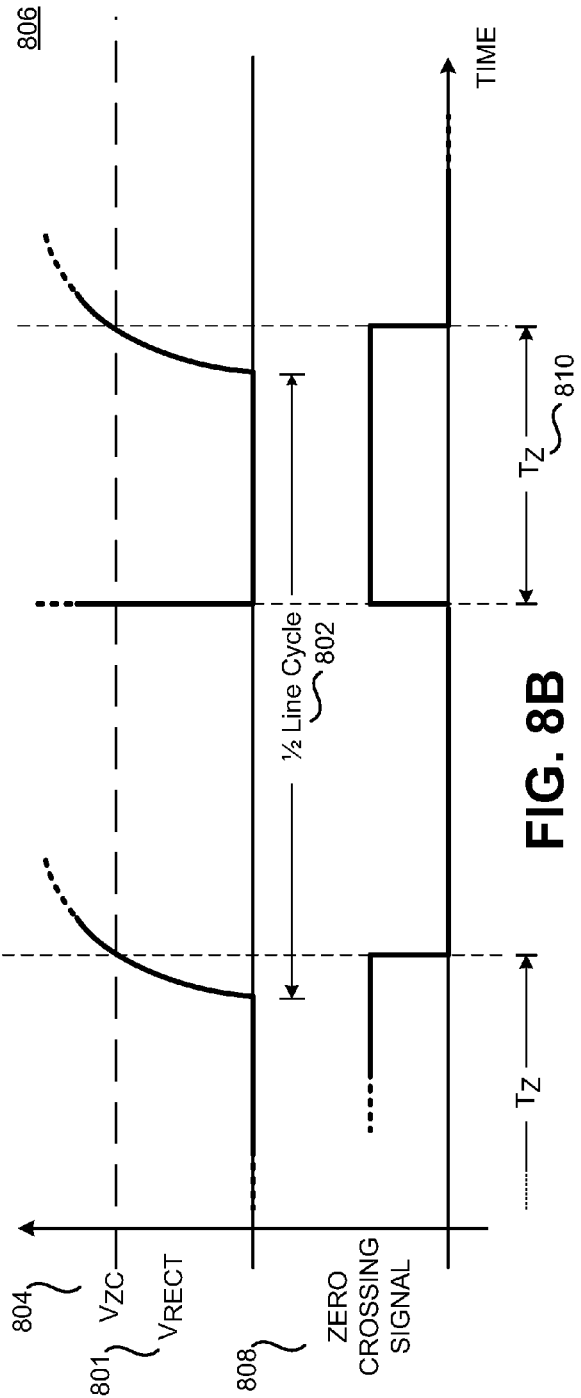
FIG. 8B is a diagram illustrating a portion of the example rectified input voltage of FIG. 8A and corresponding zero-crossing signal in accordance with an embodiment of the present invention.

Referring next to FIG. 8A, another example waveform of the rectified voltage $V_{RECT}$ 801 is illustrated including half line cycle 802, zero-crossing voltage threshold $V_{ZC}$ 804, peak voltage $V_P$ 805, and portion 806. FIG. 8B illustrates the portion 806 of the rectified voltage $V_{RECT}$ 801 and the corresponding zero-crossing signal 808.

The example waveform of the rectified voltage $V_{RECT}$ 801 is similar to the rectified voltage $V_{RECT}$ 606 shown in FIG. 7A. In the example of FIG. 7A, the rectified voltage $V_{RECT}$ 606 is the result of the ac input voltage $V_{AC}$ 102 which has passed through dimmer circuit 608 and rectifier 604. As mentioned with regards to FIGS. 6, 7A and 7B, the rectified voltage $V_{RECT}$ 606 is the result of the dimmer circuit 608, such as a triac dimmer, which disconnects the ac input voltage $V_{AC}$ 102 at the beginning of every half line cycle 802. However, the rectified voltage $V_{RECT}$ 801 illustrated in FIGS. 8A and 8B is a result of a dimmer circuit 608 disconnecting the ac input voltage $V_{AC}$ 102 at the end of every half line cycle 802. As a result the rectified voltage $V_{RECT}$ 801 is substantially equal to zero voltage at the end of the half line cycle 802. At the beginning of the half line cycle 802, the rectified voltage $V_{RECT}$ 801 substantially follows the positive magnitude of the ac input voltage $V_{AC}$ 102 until the dimmer circuit 608 disconnects the ac input voltage $V_{AC}$ 102 from the power supply. The value of the rectified voltage $V_{RECT}$ 801 then discharges to substantially zero voltage until the beginning of the next half line cycle.

FIG. 8B illustrates the portion 806 of the rectified voltage $V_{RECT}$ 801 and the corresponding zero-crossing signal 808. The ac input voltage $V_{AC}$ 102 is indirectly sensed through the switch current $I_D$ 144 to produce the zero-crossing signal 808. When the rectified voltage $V_{RECT}$ 801 is less than the zero-crossing voltage threshold $V_{ZC}$ 804, the zero-crossing signal 808 indicates that the zero-crossing condition exists. For embodiments of the present invention, the controller 138 utilizes on-time extension of the switch S1 114 to determine the zero-crossing of the ac input voltage $V_{AC}$ 102

In comparing the zero-crossing signal 808 shown in FIG. 8B to the zero-crossing signal 208 shown in FIG. 2B, the zero-crossing pulse $T_Z$ 810 of FIG. 8B is longer than the zero-crossing pulse $T_Z$ 210 of FIG. 2B due to the disconnection of the ac input voltage $V_{AC}$ 102 by dimmer circuit 608. In comparing the zero-crossing signal 808 shown in FIG. 8B to the zero-crossing signal 708 shown in FIG. 7B, the zero-crossing pulse $T_Z$ 810 of FIG. 8B occurs towards the end of the half line cycle 802 rather than at the beginning of the half line cycle 802 as shown in FIG. 7B.

Figure 9A:
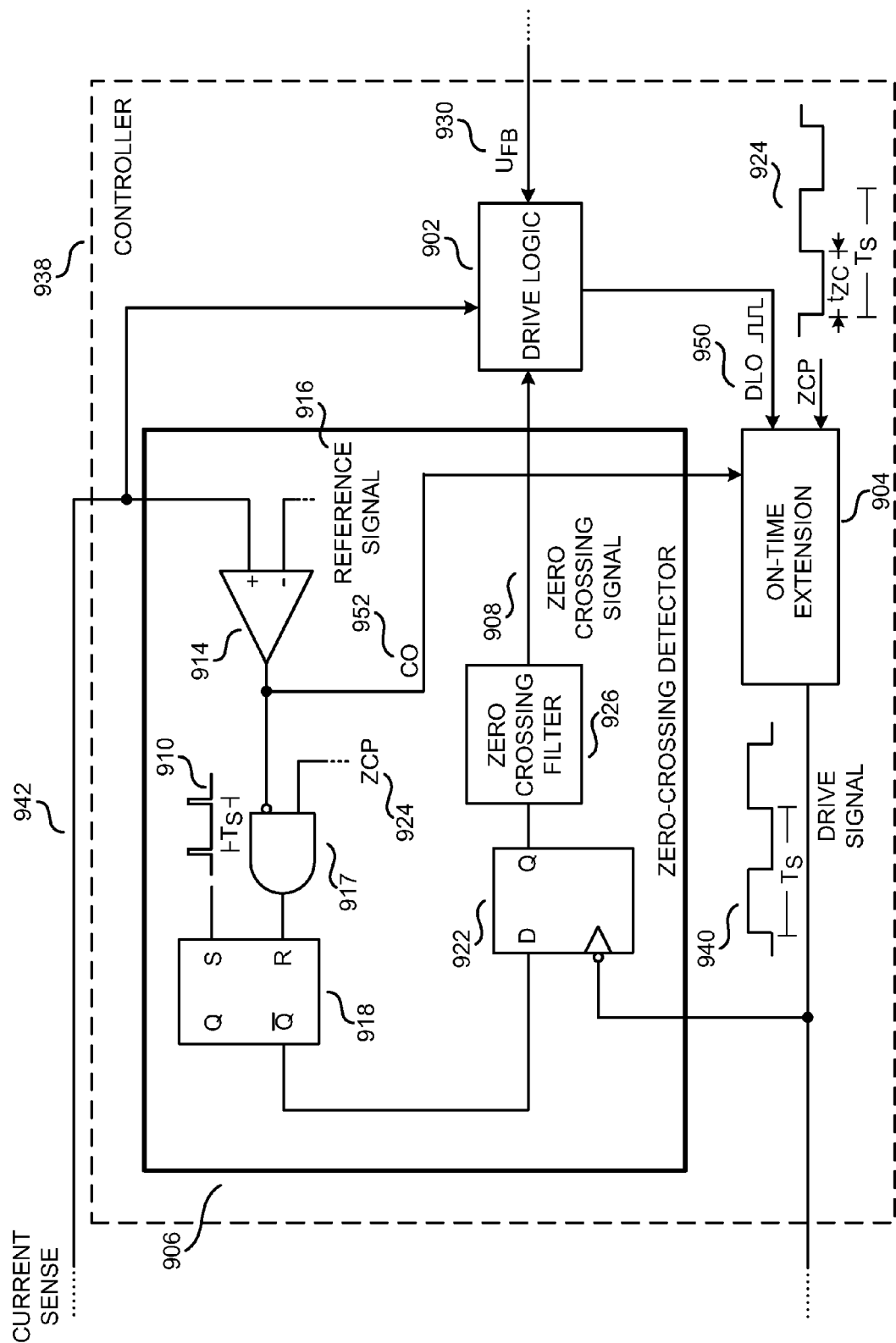
FIG. 9A is a functional block diagram of a controller in accordance with an embodiment of the present invention.
Figure 9B:
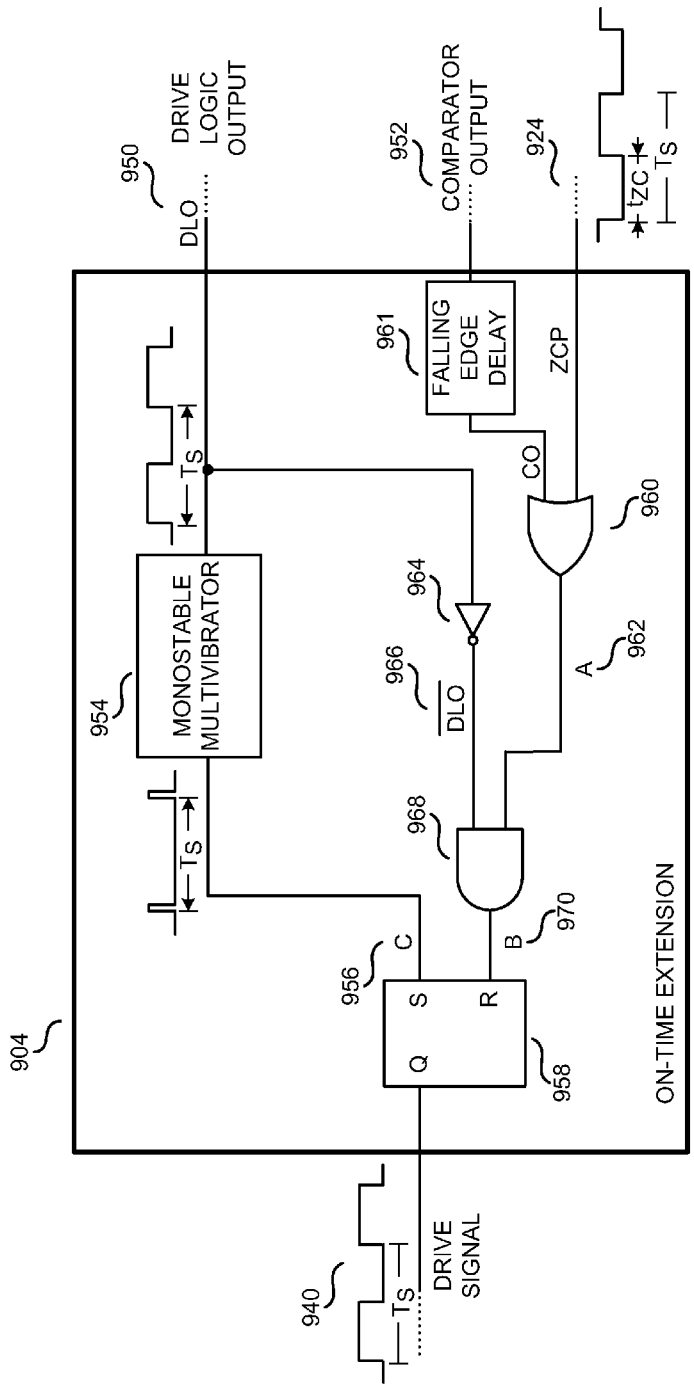
FIG. 9B is a functional block diagram of an on-time extension block of the controller of FIG. 9A in accordance with an embodiment of the present invention.
Figure 10:
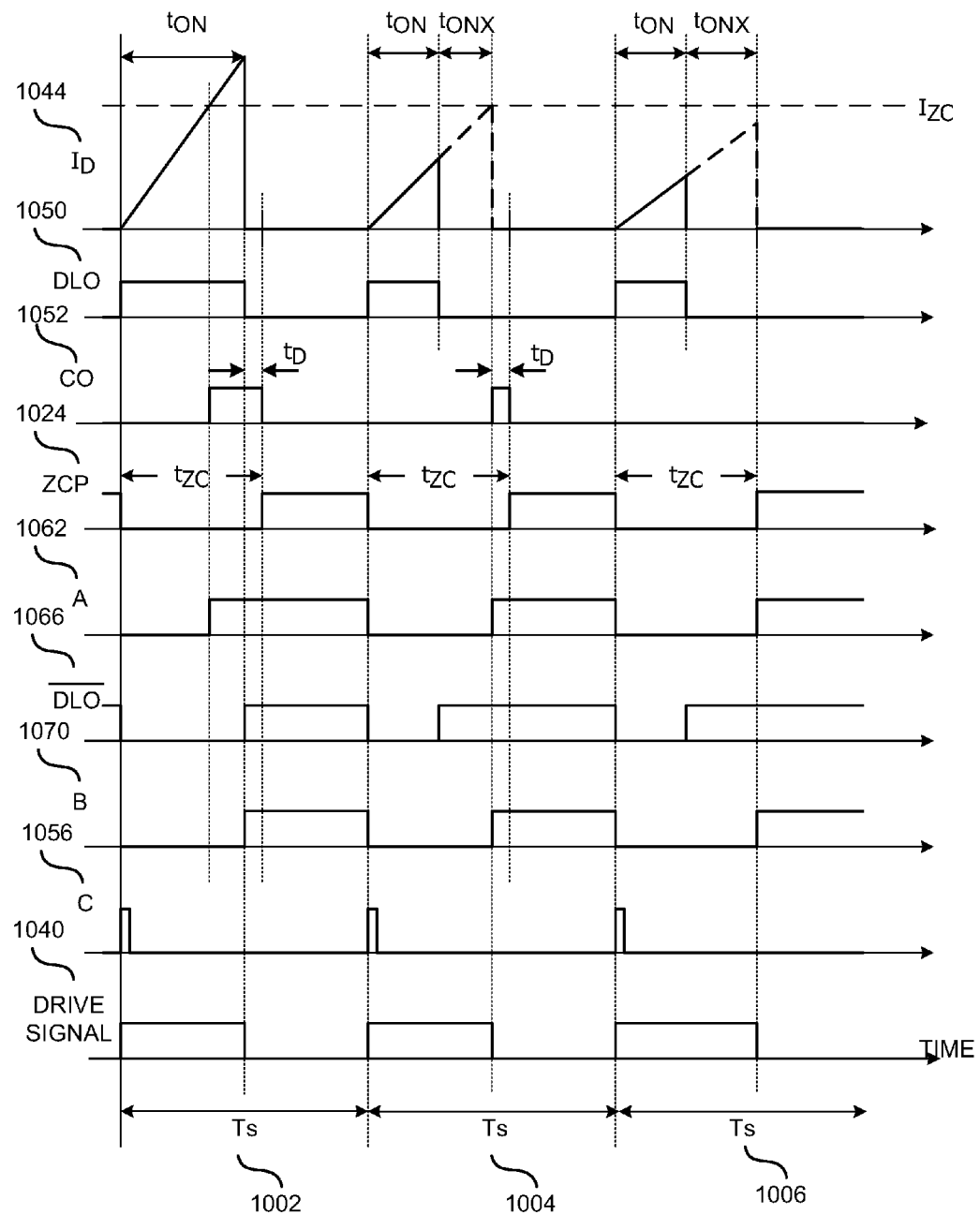
FIG. 10 is a diagram illustrating various waveforms of signals of the controller and on-time extension block of FIGS. 9A and 9B in accordance with an embodiment of the present invention.

Referring next to FIG. 9A, a functional block diagram of a controller 938 is illustrated including feedback signal $U_{FB}$ 930, drive signal 940, current sense signal 942, a drive logic block 902, an on-time extension block 904, a zero-crossing detector 906, a zero-crossing signal 908, and a zero-crossing time threshold pulse ZCP 924. The zero-crossing detector 906 further includes a clock signal 910, a comparator 914, a reference signal 916, an AND gate 917, an S-R latch 918, a flip-flop 922, and an optional zero-crossing filter 926. The controller 938, feedback signal $U_{FB}$ 930, drive signal 940, and current sense signal 942 are examples of the controller 138, feedback signal $U_{FB}$ 130, drive signal 140, and current sense signal 142 illustrated in FIGS. 1 and 6. In addition, the zero-crossing signal 908 is one example of the zero-crossing signal shown in FIGS. 2, 4A, 4B, 7B and 8B. In one example, drive logic block 902 and on-time extension block 904 may be referred to herein collectively as a drive signal generator. Signal annotations drive logic output DLO 950, zero-crossing time threshold pulse ZCP 924, and comparator output CO 952 are also shown in FIG. 9A and FIG. 9B. The waveforms of the respective signals are illustrated in FIG. 10.

The controller 938, feedback signal $U_{FB}$ 930, drive signal 940, and current sense signal 942 couple and function as described above. Within the controller 938, the drive logic block 902 couples to the on-time extension block 904 and the zero-crossing detector 906. The drive logic block 902 receives the current sense signal 942 and the feedback signal $U_{FB}$ 930 and outputs a drive logic output DLO 950 to the on-time extension block 904. The drive logic block 902 further couples to the zero-crossing detector 906 and receives the zero-crossing signal 908. The zero-crossing detector 906 couples to and receives the current sense signal 942. As will be explained further, the zero-crossing detector 906 receives the current sense signal 942 and outputs the zero-crossing signal 908 to the drive logic block 902.

The drive logic block 902 utilizes the feedback signal $U_{FB}$ 930, current sense signal 942, and the zero-crossing signal 908 to generate the drive logic output signal DLO 950 which provides information regarding the state of the drive signal 940 and the state of the controller 938 to the on-time extension block 904. The on-time extension block 904 further couples to the zero-crossing detector 906 and receives the output of the comparator 914, herein referred to as comparator output CO 952 (i.e., pre-condition signal). In addition, on-time extension block 904 receives the zero-crossing time threshold pulse ZCP 924. The zero-crossing time threshold pulse ZCP 924 is a rectangular pulse waveform with logic high and logic low sections. The length of the logic low section is substantially equal to the zero-crossing time threshold $t_{ZC}$ 506 and the length of time between consecutive falling edges of the zero-crossing time threshold pulse ZCP 924 is substantially equal to the switching period $T_S$.

The on-time extension block 904 utilizes the received drive logic output DLO 950, zero-crossing time threshold pulse ZCP 924, and the comparator output CO 952 to output the drive signal 940. As mentioned above, the drive signal 940 is utilized to control the switching of the switch of the power supply (e.g., switch S1 114 of FIG. 1). The drive signal 940 is also received by the flip-flop 922 of the zero-crossing detector 906. In addition, the on-time extension block 904 implements the on-time extension discussed with respect to FIG. 5.

The drive logic block 902 receives information regarding the switch current $I_D$ 144 from the current sense signal 942 and information regarding the output quantity $U_O$ from the feedback signal $U_{FB}$ 930 along with the zero-crossing signal 908. Utilizing this information, the drive logic block 902 provides information regarding the intended drive signal to control the turning on and turning off of the switch S1 114. In one example, the drive logic block 902 may utilize the current sense signal 942 to determine when the switch current $I_D$ 144 reaches the current limit threshold $I_{LIM}$ 402 to turn off switch S1 114. The drive logic output DLO 950 is received by the on-time extension block 904 along with the comparator output CO 952 and the zero-crossing time threshold pulse ZCP 924. As will be further discussed, depending on the value of the comparator output CO 952 and the zero-crossing time threshold pulse ZCP 924, the on-time extension block 904 may extend the on-time of the intended drive signal provided by the drive logic block 902.

The zero-crossing detector 906 further includes the comparator 914 which receives the current sense signal 942 and the reference signal 916. In the example of FIG. 9A, the comparator 914 receives the current sense signal 942 at the non-inverting input of the comparator 914 and the reference signal 916 at the inverting input of the comparator 914. Thus, in one embodiment, the current sense signal 942 being less than reference signal 916 (and thus the output of the comparator 914 being low) indicates the presence of a pre-condition for a zero-crossing condition of the power supply (i.e., a zero-crossing condition may be present). The current sense signal 942 and the reference signal 916 may be a current signal or a voltage signal. The current sense signal 942 provides information regarding the switch current $I_D$ 144. When the current sense signal 942 is a current signal, the reference signal 916 may be the zero-crossing current threshold $I_{ZC}$ 404 and the comparator 914 is a current comparator. As mentioned above, the switch current $I_D$ 144 may be sensed in a variety of ways, such as for example the voltage across a discrete resistor or the voltage across a transistor when the transistor is conducting. For those examples the current sense signal 942 is a voltage signal. When the current sense signal 942 is a voltage signal, the reference signal 916 is a reference voltage that corresponds to the zero-crossing current threshold $I_{ZC}$ 404 and the comparator 914 is a voltage comparator.

The comparator 914 is further coupled to the AND gate 917 and the on-time extension block 904. The output of the comparator 914 is received by the on-time extension block 904. The AND gate 917 is also coupled to receive the zero-crossing time threshold pulse ZCP 924. The circle coupled to the input of the AND gate 917 which receives the comparator output CO 952 indicates that an inverter is coupled between the comparator 914 and the AND gate 917 such that the AND gate 917 receives the inverted comparator output CO 952. For example, the output of the AND gate 917 is at the logic high value when the zero-crossing time threshold pulse ZCP 924 is at the logic high value and the comparator output CO 952 is at the logic low value.

The S-R latch 918 receives the output of the AND gate 917 at the reset input, herein also referred to as the R-input of the S-R latch 918. In addition, the S-R latch 918 receives the clock signal 910 at the set input, herein also referred to as the S-input. The clock signal 910 provides information regarding the switching period $T_S$ and in some embodiments may come from an oscillator (not shown). The clock signal 910 is a rectangular pulse signal with varying lengths of logic high and logic low sections. The length of time between consecutive rising edges of the clock signal 910 is substantially equal to the switching period $T_S$. Once the clock signal 910 pulses to the logic high value, the clock signal 910 quickly falls to the logic low value. As such, the S-R latch 918 is set at rising edge of the clock signal 910. However, the S-R latch 918 resets when the output of AND gate 917 is at the logic high value. In other words, the latch 918 resets when the comparator output CO 952 indicates that the switch current $I_D$ 144 provided by current sense signal 942 has not exceeded the zero-crossing current threshold $I_{ZC}$ 404 provided by the reference signal 916. In the example of FIG. 9A, the output of the S-R latch 918 is taken from the Q-bar output. As such, when the S-R latch 918 is set, the output of the S-R latch 918 is the logic low value. When the S-R latch 918 is reset, the output of the S-R latch is the logic high value.

The flip-flop 922 couples to the S-R latch 918 and receives the output of the S-R latch 918. In one embodiment, the flip-flop 922 is a D flip-flop. The flip-flop 922 receives the output of latch 918 at the D-input. In addition, the flip-flop 922 receives the drive signal 940 at the clock input. The drive signal 940 is a rectangular pulse waveform with varying lengths of logic high and logic low sections. In one embodiment, switch S1 114 being closed (i.e. ON) corresponds to a logic high value of the drive signal 940 while switch S1 114 being open (i.e. OFF) corresponds to a logic low value of the drive signal 940. The circle coupled to the clock input of the flip-flop 922 indicates that the flip flop 922 updates at the falling edge of the drive signal 940. In other words, the output of the flip-flop 922 updates when the switch S1 114 turns OFF. The flip-flop 922 is further coupled to the zero-crossing filter 926. As illustrated, the zero-crossing filter 926 receives the output of the flip-flop 922 and outputs the zero-crossing signal 908. The output of the flip-flop 922 is substantially equal to the zero-crossing signal 908, however, the zero-crossing filter 926 is coupled to reduce the noise of the output of the flip-flop 922. In addition, the zero-crossing filter 926 implements the number N discussed above by preventing the zero-crossing signal 908 from indicating that the zero-crossing condition exists unless N number of consecutive switching cycles have a possible zero-crossing condition. However, when N is equal to 1, the zero-crossing filter 926 may be omitted from the zero-crossing detector 906.

At the beginning of switching period $T_S$, the current sense signal 942 is less than the reference signal 916 and as such the output of comparator 914 is logic low. In other words, at the beginning of switching period $T_S$, the switch current $I_D$ 144 is less than the zero-crossing current threshold $I_{ZC}$ 404. As mentioned above, in one embodiment the zero-crossing current threshold $I_{ZC}$ 404 is a non-zero value, which results in comparator 914 outputting the pre-condition signal (i.e., comparator output 952) prior to the zero-crossing of ac input voltage $V_{AC}$ 102. The clock signal 910 pulses to the logic high value at the beginning of the switching period $T_S$ and the output of the S-R latch 918 is set to the logic low value. The clock signal 910 quickly pulses to the logic low value and the S-R latch 918 holds the previous value. For this example, the S-R latch 918 holds the logic low value.

The flip-flop 922 updates when the switch S1 114 opens (i.e. is OFF). In other words, the flip-flop 922 updates the output of the flip-flop 922 to mirror the D-input of the flip-flop 922 at the falling edge of the drive signal 940. In general, a D flip-flop updates at the rising edge of the clock input. However, with the circle at the clock input of the flip-flop 922 to denote an inverter, the flip-flop 922 updates at the falling edge of the drive signal 940.

If the switch current $I_D$ 144 provided by the current sense signal 942 does not exceed the zero-crossing current threshold $I_{ZC}$ 404 provided by the reference signal 916 before the zero-crossing time threshold $t_{ZC}$ provided by the zero-crossing time threshold pulse ZCP 924 is reached (or in other words before the zero-crossing time threshold pulse ZCP 924 transitions to the logic high value), the zero-crossing condition is detected and the output of the AND gate 917 is the logic high value. The logic high output of the AND gate 917 resets the S-R latch 918 and the output of the S-R latch 918 is the logic high value. At the falling edge of the drive signal 940, the flip-flop 922 updates and the output of the flip-flop 922 forwards the logic high output of the S-R latch 918. In one example the output of the flip-flop 922 is filtered by the zero-crossing filter 926 and the resultant zero-crossing signal 908 is a logic high value. In one embodiment, the output of the zero-crossing filter 926 is updated after the delay time $t_X$ 436 as discussed with respect to FIG. 4B. In another embodiment, the output of the zero-crossing filter 926 is updated at the next switching cycle. In addition, the zero-crossing filter 926 may implement the N number of consecutive switching cycles with a possible zero-crossing condition before the zero-crossing detector 906 decides that the zero-crossing condition exists. In one example, zero-crossing filter 926 may include logic circuits to count the number of consecutive switching cycles where the output of flip-flop 922 is a logic high value. Thus the zero-crossing filter 926 may output the zero-crossing signal 908 that indicates the presence of a zero-crossing condition only after N number of possible zero-crossing conditions has occurred, as was described above with reference to FIG. 4B. In one example, the zero-crossing filter 926 may utilize flip-flops and a multiplexer to implement the number N. In another example, the zero-crossing filter 926 may utilize a counter to implement the number N. In some examples, the delay time $t_X$ 436 discussed with respect to FIG. 4B may be due to the components utilized for the zero-crossing filter 926. For embodiments of the present invention, a delay time $t_X$ 436 of zero may be preferred. However, embodiments of controller 138 that include a delay time $t_X$ 436 of zero may require additional circuitry. Thus, some embodiments of controller 138 may include a non-zero delay time $t_X$ 436 to reduce costs and/or circuit complexity.

If the switch current $I_D$ 144 provided by the current sense signal 942 exceeds the zero-crossing current threshold $I_{ZC}$ 404 provided by the reference signal 916 before the zero-crossing time threshold $t_{ZC}$ provided by the zero-crossing time threshold pulse ZCP 924 is reached (or in other words before the zero-crossing time threshold pulse ZCP 924 transitions to the logic high value), the zero-crossing condition is not detected and the output of the AND gate 917 is the logic low value. The S-R latch 918 is not reset and the logic low value of the S-R latch 918 is forwarded to the output of the flip-flop 922 at the falling edge of the drive signal 940. In one example, the output of the flip-flop 922 is filtered by the zero-crossing filter 926 and the resultant zero-crossing signal 908 is at the logic low value. In one example, the zero-crossing filter 926 updates its output after the delay time $t_X$ 436. as discussed with respect to FIG. 4B. In another example, the output of the zero-crossing filter 926 is updated at the next switching cycle. In addition, the zero-crossing filter 926 may implement the N number of consecutive switching cycles with no zero-crossing condition before the zero-crossing detector 906 decides that the zero-crossing condition no longer exists. For example, zero-crossing filter 926 may include logic circuits to count the number of consecutive switching cycles where the output of flip-flop 922 is a logic low value. Thus, in one example, the zero-crossing filter 926 may output the zero-crossing signal 908 that indicates that the zero-crossing condition no longer exists only after N number of switching cycles with no zero-crossing condition, as was described above with reference to FIG. 4B.

Referring next to FIG. 9B, a block diagram of the on-time extension block 904 is illustrated including zero-crossing time threshold pulse ZCP 924, drive signal 940, drive logic output DLO 950, comparator output CO 952, an optional monostable multivibrator 954, an inverter 964, a S-R latch 958, an OR gate 960, a falling edge delay 961 and an AND gate 968. In addition, FIG. 9B illustrates signal annotations A 962, B 970, C 956 and inverted drive logic output $\overline{DLO}$ 966. The waveforms of the respective signals are illustrated in FIG. 10.

The zero-crossing time threshold pulse ZCP 924, drive signal 940, drive logic output DLO 950, and the comparator output CO 952 couple and function as described above. In addition, the on-time extension block 904 may optionally include monostable multivibrator 954 which couples to and receives the drive logic output DLO 950. As described above, the drive logic output DLO 950 provides the on-time extension block 904 with information regarding the state of the controller and the intended drive signal. The drive logic output DLO 950 is a rectangular pulse waveform with varying lengths of logic high and logic low sections and the length of time between consecutive rising edges is substantially equal to the switching period $T_S$. The monostable multivibrator 954 receives the drive logic output DLO 950 and generates a pulse at every rising edge of the drive logic output DLO 950. The output of monostable multivibrator 954 is denoted as signal C 956, the example waveform of which is illustrated in FIG. 10 as waveform C 1056. Monostable multivibrator 954 couples to the S-R latch 958. For the example shown in FIG. 9B, the monostable multivibrator 954 couples to the S-input of the S-R latch 958. The S-R latch 958 receives the output of the monostable multivibrator 954, signal C 956, at the S-input. In another embodiment, signal C 956 may be generated by an oscillator (not shown).

In addition, the on-time extension block 904 couples to the comparator output 952 and the zero-crossing time threshold pulse ZCP 924. The comparator output 952 is received by the falling edge delay 961 which delays the falling edge of the comparator output 952 by a delay time of $t_D$. The falling edge delay 961 further couples to the OR gate 960 and the output of the falling edge delay 961, denoted as signal CO, is received at one input of the OR gate 960. The other input of the OR gate 960 receives the zero-crossing time threshold pulse ZCP 924. The OR gate 960 further couples to the AND gate 968 and the output of the OR gate 960, denoted as signal A 962, is received at one input of AND gate 968.

In addition, the AND gate 968 also couples to inverter 964. The inverter 964 couples to and receives the drive logic output DLO 950. Inverted drive logic output $\overline{DLO}$ 966 is outputted from the inverter 964 and received by AND gate 968. The AND gate 968 further couples to the R-input of the S-R latch 958. The output of the AND gate 968, denoted as signal B 970, is received at the R-input of S-R latch 958. The S-R latch 958 utilizes the values at the S-input and the R-input to output the drive signal 940.

As shown in FIG. 9B, when the comparator output CO 952 indicates that the switch current $I_D$ 144 is less than the zero-crossing current threshold $I_{ZC}$, the output of the OR gate 960 may block the AND gate 968 from resetting the S-R latch 958. In other words, when the comparator output CO 952 indicates that the switch current $I_D$ 144 is less than the zero-crossing current threshold $I_{ZC}$, the output of the OR gate 960 may block the S-R latch 958 from outputting a logic low value and thus extending the on-time of the switch S1 114. As will be further illustrated in FIG. 10, the output of the OR gate 960 blocks the S-R latch 958 from resetting, thus extending the on-time of the switch S1 114, until the comparator output CO 952 indicates that the switch current $I_D$ 144 has reached the zero-crossing current threshold $I_{ZC}$ or the zero-crossing time current threshold ZCP 924 indicates that the zero-crossing time threshold $t_{ZC}$ is reached. However, if the switch current $I_D$ 144 exceeds the zero-crossing current threshold $I_{ZC}$ during the initial switch on-time provided by the drive logic output DLO 950, or in other words when the drive logic output DLO 950 is at a logic high value, the S-R latch 958 resets at the falling edge of the drive logic output DLO 950 since the drive logic output DLO 950 provides information regarding the intended drive signal and the output of AND gate 968 will only reset the S-R latch 958 when both of its inputs are simultaneously logic high. The various waveforms of the signals discussed with regards to FIGS. 9A and 9B are illustrated in FIG. 10.

Referring next to FIG. 10, various waveforms corresponding to FIGS. 9A and 9B are illustrated. FIG. 10 illustrates the differences between the various waveforms of the controller 938 and on-time extension block 904 to implement on-time extension for zero-crossing detection. Example waveforms $I_D$ 1044, DLO 1050, $\overline{DLO}$ 1066, CO 1052, ZCP 1024, A 1062, B 1070, C 1056, and drive signal 1040 correspond to the switch current $I_D$ 144, drive logic output DLO 950, inverter drive logic output $\overline{DLO}$ 966, falling edge delayed comparator output CO, zero-crossing time current threshold ZCP 924, and signal annotations A 962, B 970, C 956 and drive signal 940. In addition, FIG. 10 illustrates switching cycles 1002, 1004 and 1006. As illustrated, each switching cycle has a switching period of $T_S$.

For the example shown in FIG. 10, at the beginning of every switching cycle the drive logic output DLO 1050 is at the logic high value. In addition, the comparator output CO 1052 is at the logic low value since the switch current $I_D$ 1044 is less than the zero-crossing current threshold $I_{ZC}$. The zero-crossing time threshold pulse ZCP 1024 is at the logic low value at the beginning of every switching cycle. The output of the OR gate 960, waveform A 1062, is at the logic low value. The AND gate 968 receives the logic low value of waveform A 1062 and the inverted drive logic output $\overline{DLO}$ 1066 (currently at the logic low value) and as a result the waveform B 1070 is the logic low value at the beginning of every switching cycle. The monostable multivibrator 954 receives the drive logic output DLO 1050 and outputs a logic high pulse shown with waveform C 1056. At the beginning of every switching cycle, the waveform C 1056 is at the logic high value while the waveform B 1070 is at the logic low value. As a result the S-R latch 958 outputs the drive signal 1040 at the logic high value and the switch S1 114 turns on and the switch current $I_D$ 1044 begins to increase. The waveform C 1056 quickly falls to the logic low value and the S-R latch 958 holds the previous value. At the beginning of every switching cycle, the S-R latch 958 holds the logic high value and the switch S1 114 remains on. However, S-R latch 958 outputs the logic low value and therefore turns switch S1 114 off when waveform B 1070 at the R-input pulses to the logic high value. The various conditions which waveform B 1070 pulses to the logic high value will be further discussed below.

At switching cycle 1002, the switch current $I_D$ 1044 exceeds the zero-crossing current threshold $I_{ZC}$ during the initial on-time $t_{ON}$ provided by the drive logic output DLO 1050. Or in other words, the switch current $I_D$ 1044 exceeds the zero-crossing current threshold $I_{ZC}$ before the falling edge of the drive logic output DLO 1050. When the switch current $I_D$ 1044 exceeds the zero-crossing current threshold $I_{ZC}$ the comparator output CO 1052 transitions to the logic high value. For switching cycle 1002, waveform ZCP 1024 is still at the logic low value when the comparator output CO 1052 transitions to the logic high value, as a result waveform A 1062 transitions to the logic high value. For the example switching cycle 1002, waveform B 1070 pulses to the logic high value when the drive logic output DLO 1050 transitions to the logic low value since the AND gate 968 receives the inverted drive logic output $\overline{DLO}$ 1066 due to inverter 964. In other words, waveform B 1070 transitions to the logic high value when the inverted drive logic output $\overline{DLO}$ 1066 transitions to the logic high value. At the falling edge of the drive logic output DLO 1050, waveform B transitions to the logic high value and the S-R latch 958 is reset and the drive signal 1040 falls to the logic low value. As such the switch S1 114 turns off and the switch current $I_D$ 1044 falls substantially to zero. When the switch current $I_D$ 1044 falls below the zero-crossing current threshold $I_{ZC}$, the comparator output CO 1052 falls to the logic low value. However, the falling edge of the comparator output CO 1052 is delayed by a delay time of $t_D$ due to the falling edge delay 961.

At switching cycle 1004, the switch current $I_D$ 1044 does not exceed the zero-crossing current threshold $I_{ZC}$ during the initial on-time $t_{ON}$ provided by the drive logic output DLO 1050 and the controller extends the on-time of the switch S1 114. Or in other words, the switch current $I_D$ 1044 does not exceed the zero-crossing current threshold $I_{ZC}$ before the falling edge of the drive logic output DLO 1050 and the comparator output CO 1052 remains at the logic low value. As illustrated in FIG. 10, the extended on-time $t_{ONX}$ is the length of time between the falling edge of the drive logic output DLO 1050 and when the switch S1 114 turns off. In other words, the extended on-time $t_{ONX}$ is the length of time between the falling edge of the drive logic output DLO 1050 and the falling edge of the drive signal 1040. In addition, the switch current $I_D$ 1044 does exceed the zero-crossing current threshold $I_{ZC}$ before the rising edge of the zero-crossing time threshold pulse ZCP 1024. When the switch current $I_D$ 1044 exceeds the zero-crossing current threshold $I_{ZC}$, the comparator output CO 1052 pulses to the logic high value and the OR gate 960 outputs the logic high value (illustrated in FIG. 10 as waveform A 1062 transitioning to the logic high value). One input of the AND gate 968 receives the logic high value from waveform A 1062 and the other input of the AND gate 968 receives the logic high value from the inverted drive logic output $\overline{DLO}$ 1066. As a result, waveform B 1070 transitions to the logic high value and resets the latch 958. The drive signal 1040 falls to the logic low value and turns switch S1 114 off and the switch current $I_D$ 1044 falls substantially to zero. When the switch current $I_D$ 1044 falls below the zero-crossing current threshold $I_{ZC}$, the comparator output CO 1052 falls to the logic low value. However, the falling edge of the comparator output CO 1052 is delayed by a delay time of $t_D$ due to the falling edge delay 961.

At switching cycle 1006, the switch current $I_D$ 1044 does not exceed the zero-crossing current threshold $I_{ZC}$ during the initial on-time $t_{ON}$ provided by the drive logic output DLO 1050 and the controller extends the on-time of the switch S1 114. In addition, the switch current $I_D$ 1044 does not exceed the zero-crossing current threshold $I_{ZC}$ before the rising edge of the zero-crossing time threshold pulse ZCP 1024. As shown, the extended on-time $t_{ONX}$ is the length of time between the falling edge of the drive logic output DLO 1050 and when the switch S1 114 turns off. The comparator output CO 1052 remains at the logic low value for the entire switching cycle 1006. Waveform A, therefore, transitions to the logic high value at the rising edge of the zero-crossing time threshold pulse ZCP 1024. When waveform ZCP 1024 transitions to the logic high value, waveform B 1070 will transition to a logic high value, the S-R latch 958 then resets and the drive signal 1040 falls to the logic low value and turns switch S1 114 off and the switch current $I_D$ 1044 falls substantially to zero.

While the invention herein disclosed has been described by means of specific embodiments, examples and applications thereof, numerous modifications and variations could be made thereto by those skilled in the art without departing from the scope of the invention set forth in the claims.

What is claimed is:

1. A controller for a switched mode power supply, the controller comprising:
a zero-crossing detector coupled to generate a zero-crossing signal that indicates a zero-crossing condition in the power supply;
drive logic coupled to the zero-crossing detector to generate a drive logic output signal in response to the zero-crossing signal and in response to a feedback signal representative of an output of the power supply, wherein the drive logic output signal is representative of an on-time of a switch to regulate the output of the power supply; and a logic gate coupled to receive a first signal representative of a current through the switch and a second signal representative of a zero-crossing time threshold, wherein the logic gate is further coupled to extend the on-time of the switch until the current through the switch reaches a zero-crossing current threshold or until the on-time of the switch reaches the zero-crossing time threshold.

2. The controller of claim 1, wherein the logic gate comprises an OR gate.

3. The controller of claim 1, further comprising a latch coupled to generate a drive signal to control the switch, wherein the latch is set and reset in response to the drive logic output signal.

4. The controller of claim 3, wherein the logic gate is coupled to block the drive logic output signal from resetting the latch to extend the on time of the switch.

5. The controller of claim 4, further comprising an AND gate coupled to receive an inverted drive logic output signal and an output of the logic gate, wherein an output of the AND gate is coupled to reset the latch when both the output of the logic gate and the inverted drive logic output signal are logic high.

6. The controller of claim 3, further comprising a monostable multivibrator coupled to receive the drive logic output signal and generate a pulse at a rising edge of the drive logic output signal, wherein the latch is set in response to the pulse.

7. The controller of claim 1, further comprising a falling edge delay coupled to delay a falling edge of the first signal by a delay time of $t_D$, wherein the logic gate receives the first signal delayed by the delay time of $t_D$.

8. A controller for a switched mode power supply, the controller comprising:
a zero-crossing detector coupled to generate a zero-crossing signal that indicates a zero-crossing condition in the power supply;
drive logic coupled to the zero-crossing detector to generate a drive logic output signal in response to the zero-crossing signal and in response to a feedback signal representative of an output of the power supply, wherein the drive logic output signal is representative of an on-time of a switch to regulate the output of the power supply; and
a logic gate coupled to receive a first signal representative of a current through the switch and a second signal representative of a zero-crossing time threshold, wherein the logic gate is further coupled to extend the on-time of the switch if the current through the switch is less than a zero-crossing current threshold and the on-time of the switch is less than the zero-crossing time threshold.

9. The controller of claim 8, wherein the logic gate comprises an OR gate.

10. The controller of claim 8, further comprising a latch coupled to generate a drive signal to control the switch, wherein the latch is set and reset in response to the drive logic output signal.

11. The controller of claim 10, wherein the logic gate is coupled to block the drive logic output signal from resetting the latch to extend the on time of the switch.

12. The controller of claim 11, further comprising an AND gate coupled to receive an inverted drive logic output signal and an output of the logic gate, wherein an output of the AND gate is coupled to reset the latch when both the output of the logic gate and the inverted drive logic output signal are logic high.

13. The controller of claim 10, further comprising a monostable multivibrator coupled to receive the drive logic output signal and generate a pulse at a rising edge of the drive logic output signal, wherein the latch is set in response to the pulse.

14. The controller of claim 8, further comprising a falling edge delay coupled to delay a falling edge of the first signal by a delay time of $t_D$, wherein the logic gate receives the first signal delayed by the delay time of $t_D$.

* * * * *